United States Patent
Katoh et al.

(10) Patent No.: US 8,816,285 B2
(45) Date of Patent: Aug. 26, 2014

(54) DISPLAY DEVICE

(75) Inventors: Hiromi Katoh, Osaka (JP); Naru Usukura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 100 days.

(21) Appl. No.: 13/810,482

(22) PCT Filed: Jul. 22, 2011

(86) PCT No.: PCT/JP2011/066735
§ 371 (c)(1),
(2), (4) Date: Jan. 16, 2013

(87) PCT Pub. No.: WO2012/014817
PCT Pub. Date: Feb. 2, 2012

(65) Prior Publication Data
US 2013/0112880 A1     May 9, 2013

(30) Foreign Application Priority Data

Jul. 26, 2010 (JP) ................. 2010-167446

(51) Int. Cl.
*G01J 5/10* (2006.01)
*G06F 3/041* (2006.01)
*G06F 3/042* (2006.01)

(52) U.S. Cl.
CPC .............. *G06F 3/0412* (2013.01); *G06F 3/042* (2013.01)
USPC ....................................... 250/349

(58) Field of Classification Search
CPC ....... G01J 5/10; G06K 7/10732; G06F 3/017; G06F 3/033
USPC ....................................... 250/349
See application file for complete search history.

(56) References Cited

U.S. PATENT DOCUMENTS

| 6,333,735 | B1 * | 12/2001 | Anvekar ................. 345/175 |
| 6,429,857 | B1 * | 8/2002 | Masters et al. ........... 345/175 |
| 2006/0103637 | A1 | 5/2006 | Yamaguchi et al. |
| 2009/0295760 | A1 * | 12/2009 | Linge et al. ............. 345/179 |

FOREIGN PATENT DOCUMENTS

| JP | 11-143633 A | 5/1999 |
| JP | 3521187 B2 | 4/2004 |

(Continued)

OTHER PUBLICATIONS

Official Communication issued in International Patent Application No. PCT/JP2011/066735, mailed on Oct. 25, 2011.

*Primary Examiner* — Marcus Taningco
(74) *Attorney, Agent, or Firm* — Keating & Bennett, LLP

(57) ABSTRACT

A photosensor-equipped display device is provided having a combination of visible and non-visible light sources where a voltage drop is minimized when the non-visible light sources are turned on. The display device includes: a plurality of infrared LEDs (3b); photosensors (9) provided in a pixel region (4) for detecting reflected light originating from the infrared LEDs (3b); a sensor row driver circuit (7) configured to supply a sensor drive signal to the photosensors (9); an amplifier circuit (6) configured to amplify a signal read from the photosensors (9) in response to the sensor drive signal and output a photosensor signal; a signal processing circuit (20) configured to process the photosensor signal output from the amplifier circuit (6); and a backlight control circuit (13) configured to control on and off of the infrared LEDs (3b). The plurality of photosensors (9) are divided into a plurality of sensor groups in the pixel region (4). The light source control circuit (13) causes separate sets of infrared LEDs (3b), corresponding to the sensor groups, to be on during different time periods.

14 Claims, 16 Drawing Sheets

(56) References Cited

FOREIGN PATENT DOCUMENTS

| | | | |
|---|---|---|---|
| JP | 2005-275644 A | 10/2005 | |
| JP | 4072732 B2 | 4/2008 | |
| JP | 2008-234477 A | 10/2008 | |
| JP | 2008-262204 A | 10/2008 | |

* cited by examiner

DISPLAY DEVICE

TECHNICAL FIELD

The present invention relates to photosensor-equipped display devices including light detecting elements such as photodiodes, and more particularly, to display devices including photosensors in its pixel region.

BACKGROUND ART

Photosensor-equipped display devices have been proposed that include light detecting elements, such as photodiodes, in the pixels so as to be capable of sensing the brightness of ambient light or capturing an image of an object located close to the display. Typically, such photosensor-equipped display devices may be used as two-way communication display devices or devices with touch panel capabilities.

Such a photosensor-equipped display device is disclosed in JP 2005-275644 A, where a backlight including a combination of two different sets of light sources, each set capable of emitting visible or non-visible light, turns these sets of light sources on at different times to make it possible to detect the location of an object independently from image display.

As discussed above, in a display device with a backlight including a combination of visible and non-visible light sources, the non-visible light sources are driven in a synchronized manner with the sensing of light by the photosensors. A problem with this arrangement is that turning on the non-visible light sources may cause a momentary voltage drop at the backlight.

DISCLOSURE OF THE INVENTION

In view of this problem, an object of the present invention is to minimize a voltage drop in a display device including non-visible light sources for photosensors when the non-visible light sources are turned on.

To achieve the above object, a display device disclosed herein includes: an active matrix substrate; a plurality of non-visible light sources; photosensors provided in a pixel region of the active matrix substrate for detecting reflected light originating from the non-visible light sources; a sensor driver circuit configured to supply a sensor drive signal to the photosensors; an amplifier circuit configured to amplify a signal read from the photosensors in response to the sensor drive signal and output a photosensor signal; a signal processing circuit configured to process the photosensor signal output from the amplifier circuit; and a light source control circuit configured to control on and off of the non-visible light sources. The plurality of photosensors are divided into a plurality of sensor groups in the pixel region. The light source control circuit causes separate sets of non-visible light sources, corresponding to the sensor groups, to be on during different time periods.

The above arrangement provides a display device including non-visible light sources for photosensors where a voltage drop is minimized when the non-visible light sources are turned on.

EMBODIMENTS FOR CARRYING OUT THE INVENTION

Figure 1:
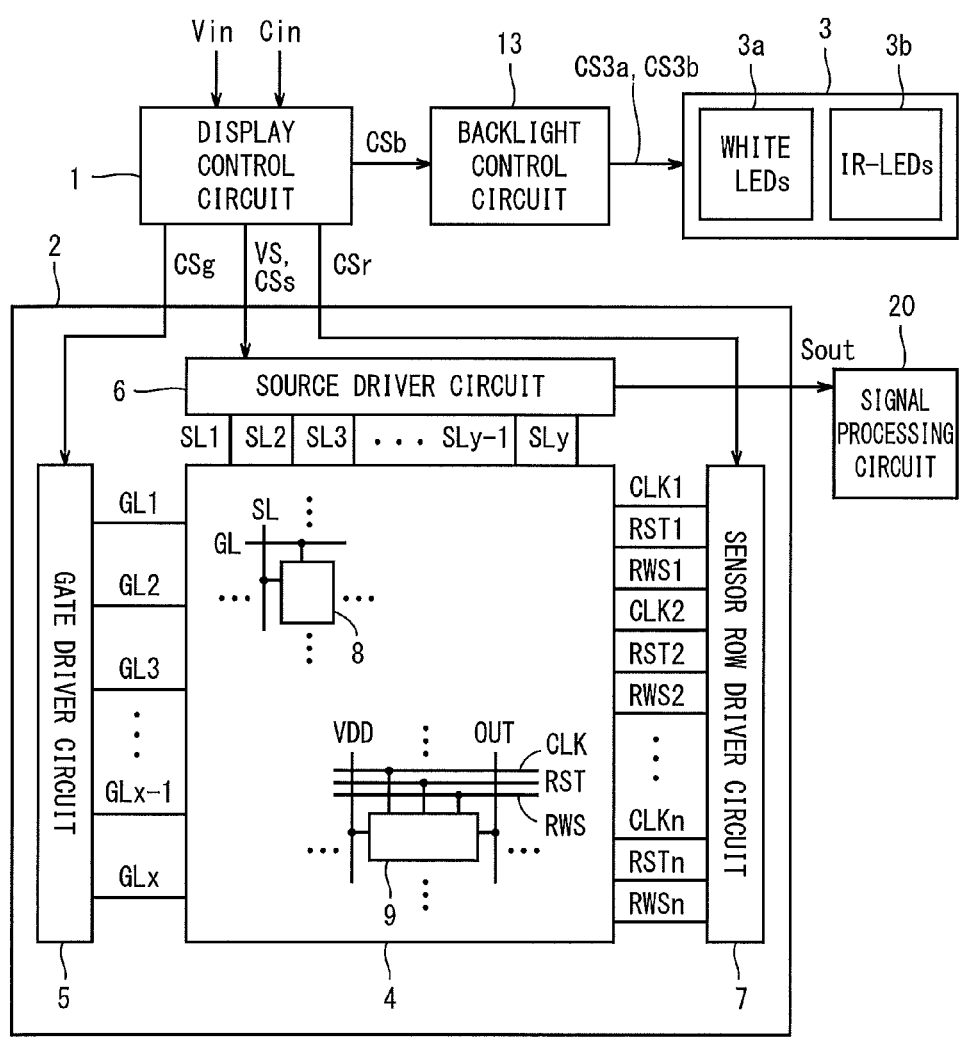
FIG. 1 is a block diagram of a display device according to an embodiment of the present invention.

A display device according to an embodiment of the present invention includes:
an active matrix substrate;
a plurality of non-visible light sources;
photosensors provided in a pixel region of the active matrix substrate for detecting reflected light originating from the non-visible light sources;
a sensor driver circuit configured to supply a sensor drive signal to the photosensors;

an amplifier circuit configured to amplify a signal read from the photosensors in response to the sensor drive signal and output a photosensor signal;

a signal processing circuit configured to process the photosensor signal output from the amplifier circuit; and a light source control circuit configured to control on and off of the non-visible light sources, wherein the plurality of photosensors are divided into a plurality of sensor groups in the pixel region, and the light source control circuit causes separate sets of non-visible light sources, corresponding to the sensor groups, to be on during different time periods (first arrangement).

Preferably, in the first arrangement above,
the active matrix substrate includes:
a gate driver; and
a plurality of gate lines connected with the gate driver,
wherein the plurality of photosensors are divided into a plurality of sensor groups arranged in a direction in which the gate lines are arranged (second arrangement).

Preferably, in the second arrangement above, the non-visible light sources are located along a side of the pixel region opposite that with the gate driver (third arrangement).

More preferably, in the third arrangement, the gate lines extend in a direction parallel to a long side of the active matrix substrate (fourth arrangement).

Preferably, also in the first arrangement above, the plurality of photosensors are divided into a plurality of sensor groups arranged in a direction in which the gate lines extend (fifth arrangement).

More preferably, in the fifth arrangement above, the non-visible light sources are located on a rear side of the pixel region (sixth arrangement).

Preferably, in the fifth or sixth arrangement above, the plurality of photosensors are also divided into a plurality of sensor groups arranged in a direction in which the gate lines are arranged (seventh arrangement).

In one of the first to seventh arrangements above, the sensor driver circuit may, in synchronization with the light source control circuit, cause each of the sensor groups to be sequentially read (eighth arrangement).

Preferably, in the first to eighth arrangements above, the non-visible light sources are infrared LEDs (ninth arrangement).

Preferably, also in one of the first to ninth arrangements above,
the photosensors includes:
a sensor pixel circuit configured to, in response to the sensor drive signal, accumulate a charge corresponding to an amount of light received during an accumulation period in which the non-visible light sources are on, and output, during a readout period, a sensor signal corresponding to the charge that has been accumulated; and an off-sensor pixel circuit configured to, in response to the sensor drive signal, accumulate a charge corresponding to an amount of light received during an accumulation period in which the non-visible light sources are off, and output, during a readout period, a sensor signal corresponding to the charge that has been accumulated, wherein the signal processing circuit calculates a difference between the sensor signal output from the sensor pixel circuit and the sensor signal output from the off-sensor pixel circuit (tenth arrangement).

More preferably, in the tenth arrangement above,
each of the sensor pixel circuit and the off-sensor pixel circuit includes:
one light receiving element;

one accumulation node capable of accumulating a charge corresponding to an amount of light sensed;

a readout transistor having a control terminal electrically connectable with the accumulation node; and a retaining switching element provided on a path of current passing through the light receiving element, the retaining switching element being configured to be turned on or off in response to the control signal (eleventh arrangement).

Preferably, in the eleventh arrangement above,
in each of the sensor pixel circuit and the off-sensor pixel circuit,
the retaining switching element is provided between the accumulation node and one terminal of the light receiving element, and
another terminal of the light receiving element is connected with a reset line (twelfth arrangement).

Preferably, also in the tenth arrangement above,
the sensor pixel circuit and the off-sensor pixel circuit share one light receiving element, and
one terminal of the light receiving element is connected with one end of a retaining switching element included in each of the first and second sensor pixel circuits and another terminal may be connected with the reset line (thirteenth arrangement).

Preferably, one of the first to thirteenth arrangements above further includes:
a counter substrate being opposite the active matrix substrate; and
liquid crystal sandwiched between the active matrix substrate and the counter substrate (fourteenth arrangement).

EMBODIMENTS

More specific embodiments of the present invention will now be described with reference to the drawings. While the embodiments below illustrate implementations where the display device of the present invention is a liquid crystal display device, the present invention is not limited to liquid crystal display devices and may be used in any display device using an active matrix substrate. Typically, the display device of the present invention may be a touch panel-equipped display device having photosensors to detect an object located close to the screen for an input operation, or a two-way communication display device including display and image capturing capabilities.

For ease of explanation, the drawings referred to below schematically show only those of the components of the embodiments of the present invention that are necessary to illustrate the present invention. Accordingly, the display device of the present invention may include an optional component not shown in the drawings referred to herein. Further, the dimensions of the parts in the drawings do not exactly represent the dimensions of the actual components, the dimension ratios of the components or the like.

First Embodiment

FIG. 1 is a block diagram of a display device according to an embodiment of the present invention. The display device shown in FIG. 1 includes a display control circuit 1, display panel 2, backlight 3 and backlight control circuit 13 (light source control circuit). The display panel 2 includes a pixel region 4, gate driver circuit 5, source driver circuit 6 (amplifier circuit) and sensor row driver circuit 7. The pixel region 4 includes a plurality of display pixel circuits 8 and a plurality of sensor pixel circuits 9 (photosensors). The display device has the capability of displaying an image on the display panel 2 and the capability of sensing light entering the display panel 2. In the following description, x is an integer not smaller than 2, y is a multiple of 3, m and n are even numbers, and the frame rate of the display device is 60 frames per second.

The display device shown in FIG. 1 is supplied with a video signal Vin and a timing control signal Cin from the outside. Based on these signals, the display control circuit 1 outputs a video signal VS and control signals CSg, CSs and CSr to the display panel 2, and outputs a control signal CSb to the backlight control circuit 13. The video signal VS may be the same as the video signal Vin, or may be created by performing signal processing on the video signal Vin.

The backlight 3 is provided on the back side of the display panel 2 and illuminates the back side of the display panel 2. The backlight 3 includes a set of white LEDs 3a, which serve as visible light sources, and a set of infrared LEDs (denoted as IR-LEDs in FIG. 1) 3b, which serve as non-visible light sources. The visible light sources (white LEDs 3a in this implementation) are light sources used to display an image in the pixel region 4. The non-visible light sources (infrared LEDs 3b in this implementation) emit light in a wavelength other than those of visible light. A touch location may be detected as light emitted from the non-visible light sources is reflected from a finger, touch pen or the like in contact with the surface of the display panel 2 and enters one or more sensor pixel circuits 9.

While the visible light sources are white LEDs 3a and the non-visible light sources are infrared LEDs 3b in this implementation, other light sources may be used. For example, these light sources may not be LEDs. It should be noted that light emitted from the visible light sources may contain light in a wavelength other than those of visible light. Although it is preferable that light emitted from the non-visible light sources does not contain a component in a visible light wavelength, it is not necessary that no component in a visible light wavelength is contained at all.

The backlight control circuit 13 supplies the white LEDs 3a with a drive current CS3a that controls on and off of these LEDs. The backlight control circuit 13 supplies the infrared LEDs 3b with a drive current CS3b that controls on and off of these LEDs. The on/off timing of the infrared LEDs 3b, which serve as non-visible light sources, will be described further below.

In the present embodiment, the infrared LEDs 3b are divided into two groups, i.e. a first infrared LED group 3b1 and second infrared LED group 3b2. In the present embodiment, the infrared LEDs belonging to the first infrared LED group 3b1 illuminate the upper half of the pixel region 4 as viewed in a vertical direction. The infrared LEDs belonging to the second infrared LED group 3b2 emit light at times different from those for the infrared LEDs belonging to the first infrared LED group 3b1 and illuminate the lower half of the pixel region 4 as viewed in a vertical direction.

(x×y) display pixel circuits 8 and (n×m/2) sensor pixel circuit 9 are arranged in a two-dimensional array in the pixel region 4 of the display panel 2. More specifically, x gate lines GL1 to GLx and y source lines SL1 to Sly are provided in the pixel region 4. The gate lines GL1 to GLx are parallel to each other, and the source lines SL1 to Sly are perpendicular to the gate lines GL1 to GLx and parallel to each other. The (x×y) display pixel circuits 8 are each located in the vicinity of the intersection of one of the gate lines GL1 to GLx and one of the source lines SL1 to Sly. The display pixel circuits 8 are each connected with one gate line GL and one source line SL. The display pixel circuits 8 are categorized into those for red display, green display and blue display. Three display pixel circuits 8, each being one of these three types, are arranged in a direction in which the gate lines GL1 to GLx extend, and constitute one color pixel.

N clock lines CLK1 to CLKn, n reset lines RST1 to RSTn and n readout lines RWS1 to RWSn are provided in the pixel region 4, parallel to the gate lines GL1 to GLx. Other signal lines or power supply lines (not shown) may be provided in the pixel region 4, parallel to the gate lines GL1 to GLx. When the sensor pixel circuits 9 are read, m lines selected from the source lines SL1 to SLy are used as power supply lines VDD1 to VDDm and other m lines are used as output lines OUT1 to OUTm.

Figure 2:
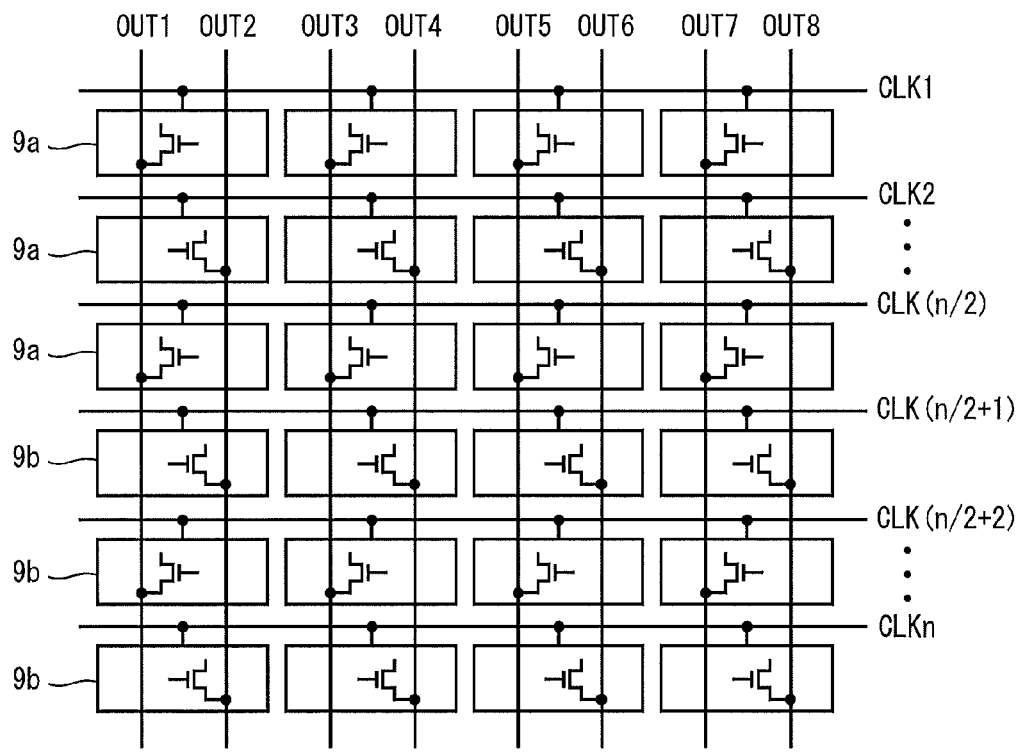
FIG. 2 illustrates an arrangement of sensor pixel circuits in a display panel included in the display device of FIG. 1.

FIG. 2 illustrates an arrangement of sensor pixel circuits 9 in the pixel region 4. The (n×m/2) sensor pixel circuits 9 include first sensor pixel circuits 9a that detect light entering them while the first infrared LED group 3b1 is on and second sensor pixel circuits 9b that detect light entering them while the second infrared LED group 3b2 is on. The same number of first sensor pixel circuits 9a and second sensor pixel circuits 9b are provided. As discussed below, the first infrared LED group 3b1 is arranged so as to illuminate the area where the first sensor pixel circuits 9a are located. The second infrared LED group 3b2 is arranged so as to illuminate the area where the second sensor pixel circuits 9b are located.

In the present embodiment, as shown in FIG. 2, the (n×m/4) first sensor pixel circuits 9a are located in a first area that covers the upper half of the pixel region 4 as viewed in a vertical direction, i.e. in the area where the clock lines CLK1 to CLK(n/2) are provided. The (n×m/4) second sensor pixel circuits 9b are located in a second area that covers the lower half of the pixel region 4 as viewed in a vertical direction, i.e. in the area where the clock lines CLK(n/2+1) to CLKn are provided.

Thus, the display panel 2 includes a plurality of output lines OUT1 to OUTm that convey output signals from the first sensor pixel circuits 9a and output signals from the second sensor pixel circuits 9b, where the first sensor pixel circuits 9a and second sensor pixel circuits 9b are connected with different output lines depending on such classification.

The gate driver 5 drives the gate lines GL1 to GLx. More specifically, in response to a control signal CSg, the gate driver circuit 5 sequentially selects one of the gate lines GL1 to GLx and applies a high-level potential to the selected gate line, and applies a low-level potential to the other gate lines. Thus, the y display pixel circuits 8 connected with the selected gate line are selected at a time.

The source driver circuit 6 drives the source lines SL1 to SLy. More specifically, in response to a control signal CSs, the source driver circuit 6 applies a potential corresponding to a video signal VS to the source lines SL1 to SLy. The source driver circuit 6 may perform line-sequential driving or point-sequential driving. The potential applied to the source lines SL1 to SLy is written to the one of the y display pixel circuits 8 that has been selected by the gate driver circuit 5. Thus, the gate driver circuit 5 and source driver circuit 6 are used to write a potential corresponding to a video signal VS into each of the display pixel circuits 8 to display a desired image on the display panel.2

The sensor row driver circuit 7 drives the clock lines CLK1 to CLKn, reset lines RST1 to RSTn, readout lines RWS1 to RWSn and the like. More specifically, in response to a control signal CSr, the sensor row driver circuit 7 applies a high-level potential and a low-level potential to the clock lines CLK1 to CLKn in accordance with the timing shown in FIG. 4 (de-scribed in detail below). In response to a control signal CSr, the sensor row driver circuit 7 selects (n/2) of the reset lines RST1 to RSTn and applies a high-level potential for reset to the selected reset lines and applies a low-level potential to the other reset lines. Thus, the (n×m/4) sensor pixel circuits 9 connected with the reset lines to which a high-level potential is applied are reset at a time.

In response to a control signal CSr, the sensor row driver circuit 7 sequentially selects two adjacent ones of the readout lines RWS1 to RWSn and applies a high-level potential for readout to the selected readout lines and applies a low-level potential to the other readout lines. The m sensor pixel circuits 9 connected with the selected two readout lines are readable at a time. At this moment, the source driver circuit 6 applies a high-level potential to the power supply lines VDD1 to VDDm. Thus, signals each corresponding to an amount of light detected by a sensor pixel circuit 9 (hereinafter referred to as "sensor signals") are output from the m readable sensor pixel circuits 9 to the output lines OUT1 to OUTm. Although in the present implementation two readout lines RWS are selected to be read at a time, one such line may be selected to be read.

The output signals from the first sensor pixel circuits 9a and the output signals from the second sensor pixel circuits 9b are sent to the source driver circuit 6. The source driver circuit 6 amplifies these output signals and outputs the amplified signals, i.e. a sensor output Sout, to the outside of the display panel 2. The sensor output Sout is processed as necessary by a signal processing circuit 20, provided outside the display panel 2. Thus, the source driver circuit 6 and sensor row driver circuit 7 are used to read sensor signals from all the sensor pixel circuits 9, thereby allowing light entering the display panel 2 to be detected.

Figure 3:
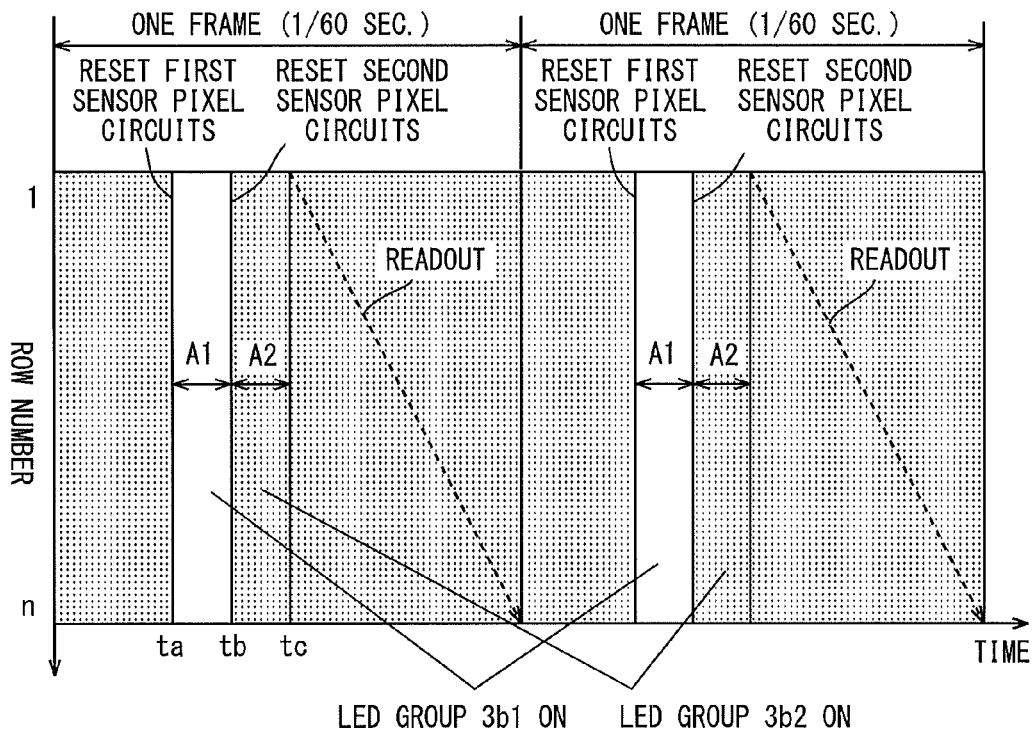
FIG. 3 illustrates the timing of on and off of the backlight where the display device of FIG. 1 is driven once in a frame, as well as the timing of resetting and readout of the sensor pixel circuits.

FIG. 3 illustrates the timing of on and off of the first infrared LED group 3b1 and second infrared LED group 3b2, as well as the timing of resetting and readout of the sensor pixel circuits 9. In the example of FIG. 3, each of the first infrared LED group 3b1 and second infrared LED group 3b2 is turned on once in one frame and is kept on for a predetermined period of time, and is otherwise off. Specifically, within one frame, the first infrared LED group 3b1 is turned on at time ta and turned off at time tb. The second infrared LED group 3b2 is turned on at time tb and turned off at time tc within one frame. In addition, all the first sensor pixel circuits 9a are reset at time ta, and all the second sensor pixel circuits 9b are reset at time tb.

The first sensor pixel circuits 9a detect light entering them in a period A1, from time ta to time tb (i.e. the period in which the first infrared LED group 3b1 is on). The second sensor pixel circuits 9b detect light entering them in a period A2, from time tb to time tc (i.e. the period in which the second infrared LED group 3b2 is on). The periods A1 and A2 are equally long. Readout operations of the first sensor pixel circuits 9a and the second sensor pixel circuits 9b occur in parallel in a line-sequential manner from time tc onward. In FIG. 3, the readout of the sensor pixel circuits 9 is completed within one frame; however, it is sufficient if the readout is completed by the time the first sensor pixel circuits 9a are reset in the next frame.

Although FIG. 3 shows an example where the sensor pixel circuits 9 are read once in one frame, the sensor pixel circuits 9 may be read twice or more in one frame.

Figure 4:
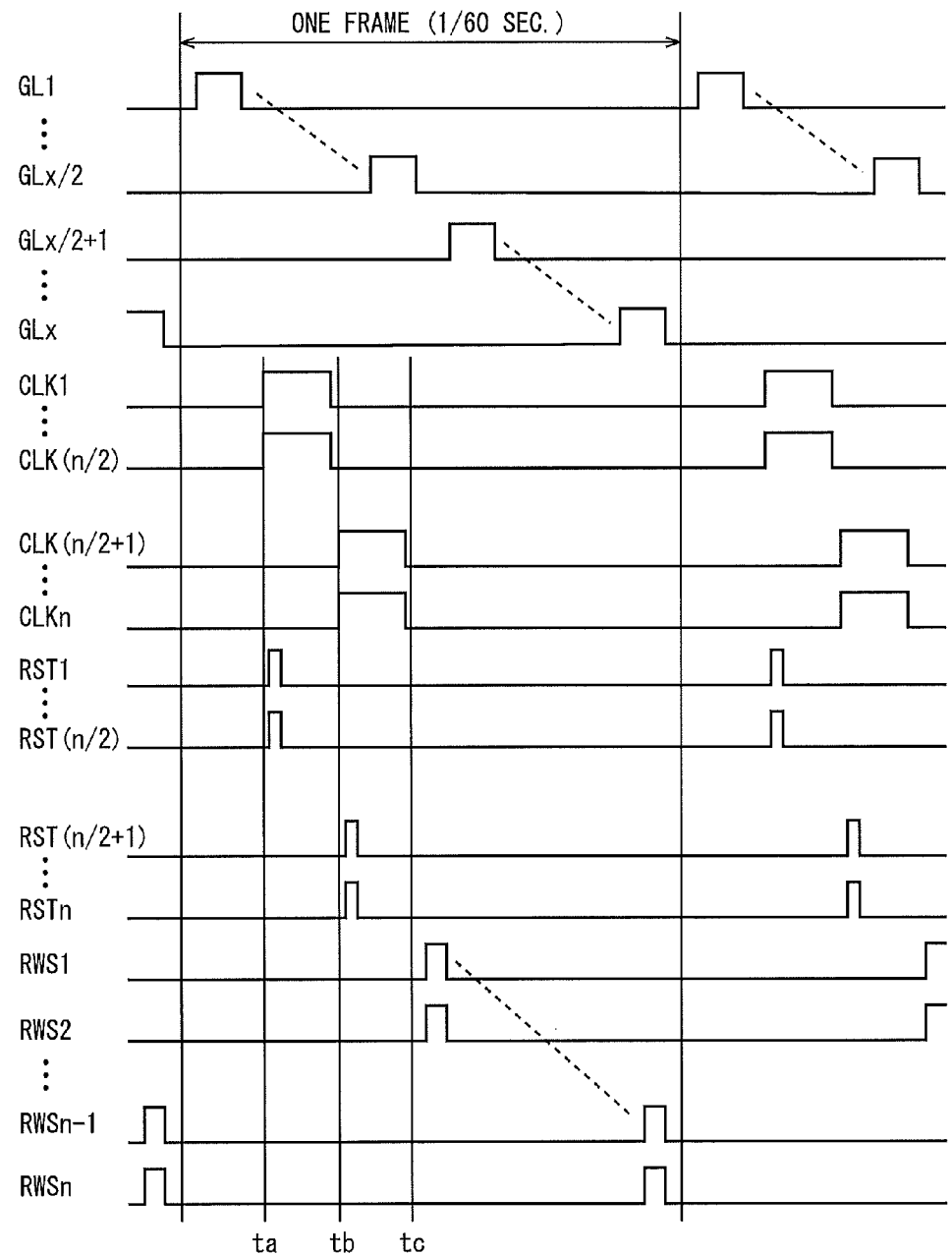
FIG. 4 is a signal waveform diagram for the display panel where the display device of FIG. 1 is driven once.

FIG. 4 is a signal waveform diagram for driving the display panel 2 in the timing shown in FIG. 3. As shown in FIG. 4, the potential on each of the gate lines GL1 to GLx sequentially goes high once in one frame, where it remains high for a predetermined period of time. The potential on each of the clock lines CLK1 to CLK(n/2) in the first area goes high once in one frame, where it remains high for period A1 (more specifically, from time ta to shortly before time tb). The potential on each of the clock lines CLK(n/2+1) to CLKn in the second area goes high once in one frame, where it remains high for period A2 (more specifically, from time tb to shortly before time tc). The potential on each of the reset lines RST1 to RST(n/2) in the first area goes high once in a frame, at around the beginning of period A1, where it remains high for a predetermined period of time. The potential on each of the reset lines RST(n/2+1) to RSTn in the second area goes high once in one frame, at around the beginning of period A2, where it remains high for a predetermined period of time. The potential on each of the (n/2) pairs of readout lines RWS1 to RWSn sequentially goes high from shortly after time tc onward, where it remains high for a predetermined period of time.

Figure 5:
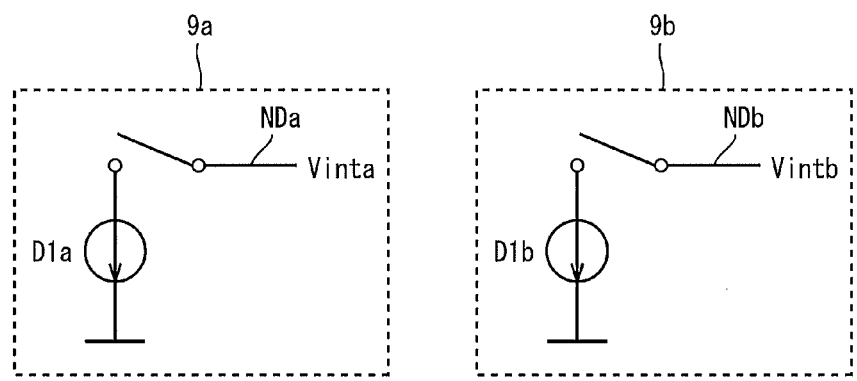
FIG. 5 schematically illustrates the sensor pixel circuits included in the display device of FIG. 1.

FIG. 5 schematically illustrates the sensor pixel circuits 9. As shown in FIG. 5, each first sensor pixel circuit 9a includes one photodiode D1a and one accumulation node NDa. The photodiode D1a draws from the accumulation node NDa a charge corresponding to an amount of light entering it while the first infrared LED group 3b1 is on (time ta to time tb). Similar to the first sensor pixel circuits 9a, each second sensor pixel circuit 9b includes one photodiode D1b and one accumulation node NDb. The photodiode D1b draws from the accumulation node NDb a charge corresponding to an amount of light entering it while the second infrared LED group 3b2 is on (time tb to time tc). In this way, a sensor signal corresponding to an amount of light entering the first sensor pixel circuit 9a during a detection period in which the first infrared LED group 3b1 is on is read out from the circuit. A sensor signal corresponding to an amount of light entering the second sensor pixel circuit 9b during a detection period in which the second infrared LED group 3b2 is on is read out from the circuit.

Any number of sensor pixel circuits 9 may be provided in the pixel region 4. For example, the same number of sensor pixel circuits 9 as the color pixels (i.e. (x×y/3) circuits) may be provided in the pixel region 4. Alternatively, a number of sensor pixel circuits 9 that is smaller than that of the color pixels (for example, a number obtained by dividing the number of color pixels by several to several dozens) may be provided in the pixel region 4.

Thus, the display device according to embodiments of the present invention is a display device in which a plurality of photodiodes (light receiving elements) are provided in the pixel region 4, the display device including a display panel 2 having a plurality of display pixel circuits 8 and a plurality of sensor pixel circuits 9, and a sensor row driver circuit 7 (driver circuit) for outputting, to the sensor pixel circuits 9, a clock signal CLK (control signal) indicating a detection period in which the first infrared LED group 3b1 is on and a detection period in which the second infrared LED group 3b2 is on. The sensor pixel circuits 9 included in the display device will be described below. In the description below, "sensor pixel circuit" is abbreviated to "pixel circuit", and a signal on a signal line is identified by the same name as the signal line itself (for example, a signal on the clock line CLKa is referred to as "clock signal CLKa").

The first sensor pixel circuits 9a are connected with clock lines CLKa, reset lines RSTa, readout lines RWSa, power supply lines VDDa and output lines OUTa. The second sensor pixel circuits 9b are connected with clock lines CLKb, reset lines RSTb, readout lines RWSb, power supply lines VDDb and output lines OUTb. Since in these embodiments the second sensor pixel circuits 9b have the same configuration as, and work similarly to, the first sensor pixel circuits 9a, part of the description of the second sensor pixel circuits 9b will be omitted.

Figure 6:
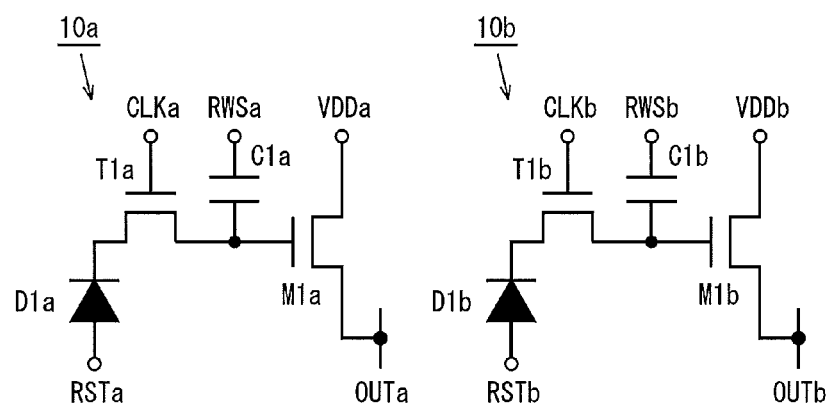
FIG. 6 shows circuit diagrams of the sensor pixel circuits according to a first embodiment of the present invention.

FIG. 6 is a circuit diagram illustrating a specific configuration of the first sensor pixel circuits 9a and second sensor pixel circuits 9b. In the present embodiment, a first pixel circuit 10a shown in FIG. 6 is an implementation of the first sensor pixel circuits 9a, while a second pixel circuit 10b is an implementation of the second sensor pixel circuits 9b. As shown in FIG. 6, the first pixel circuit 10a includes transistors T1a and M1a, photodiode D1a and capacitor C1a. The second pixel circuit 10b includes transistors T1b and M1b, photodiode D1b and capacitor C1b. The transistors T1a, M1a, T1b and M1b are n-type thin film transistors (TFTs).

In the first pixel circuit 10a, the photodiode D1a has an anode connected with the reset line RSTa and a cathode connected with the source of the transistor T1a. The transistor T1a has a gate connected with the clock line CLKa and a drain connected with the gate of the transistor M1a. The transistor M1a has a drain connected with the power supply line VDDa and a source connected with the output line OUTa. The capacitor C1a is provided between the gate of the transistor M1a and the readout line RWSa. In the first pixel circuit 10a, the node connected with the gate of the transistor M1a serves as an accumulation node that accumulates a charge corresponding to an amount of light sensed, and the transistor M1a functions as a readout transistor. The second pixel circuit 10b has the same configuration as the first pixel circuit 10a.

Figure 7:
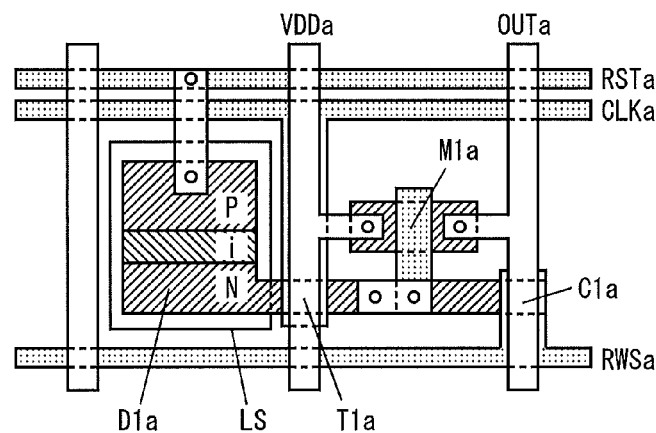
FIG. 7 is a layout of the sensor pixel circuits of FIG. 6.

FIG. 7 is a layout of the first pixel circuit 10a. As shown in FIG. 7, the first pixel circuit 10a is constructed by forming, on a glass substrate, a light shielding film LS, a semiconductor layer (hatched portion), a gate wiring layer (dotted portion), and a source wiring layer (white portion) in the stated order. Contacts (indicated by white circles) are provided where the semiconductor layer is connected with the source wiring layer and where the gate wiring layer is connected with the source wiring layer. The transistors T1a and M1a are formed by disposing the semiconductor layer and gate wiring layer such that they cross each other. The photodiode D1a is formed by disposing semiconductor layers, i.e. a p-layer, i-layer and n-layer, side by side. The capacitor C1a is formed by disposing the semiconductor layer and gate wiring layer in an overlying relationship. The light shielding film LS is made of metal and prevents light that has entered the substrate through its back side from entering the photodiode D1a. The second pixel circuit 10b is laid out in a similar manner to the first pixel circuit 10a. The first and second pixel circuits 10a and 10b may be laid out differently, as well.

Figure 8:
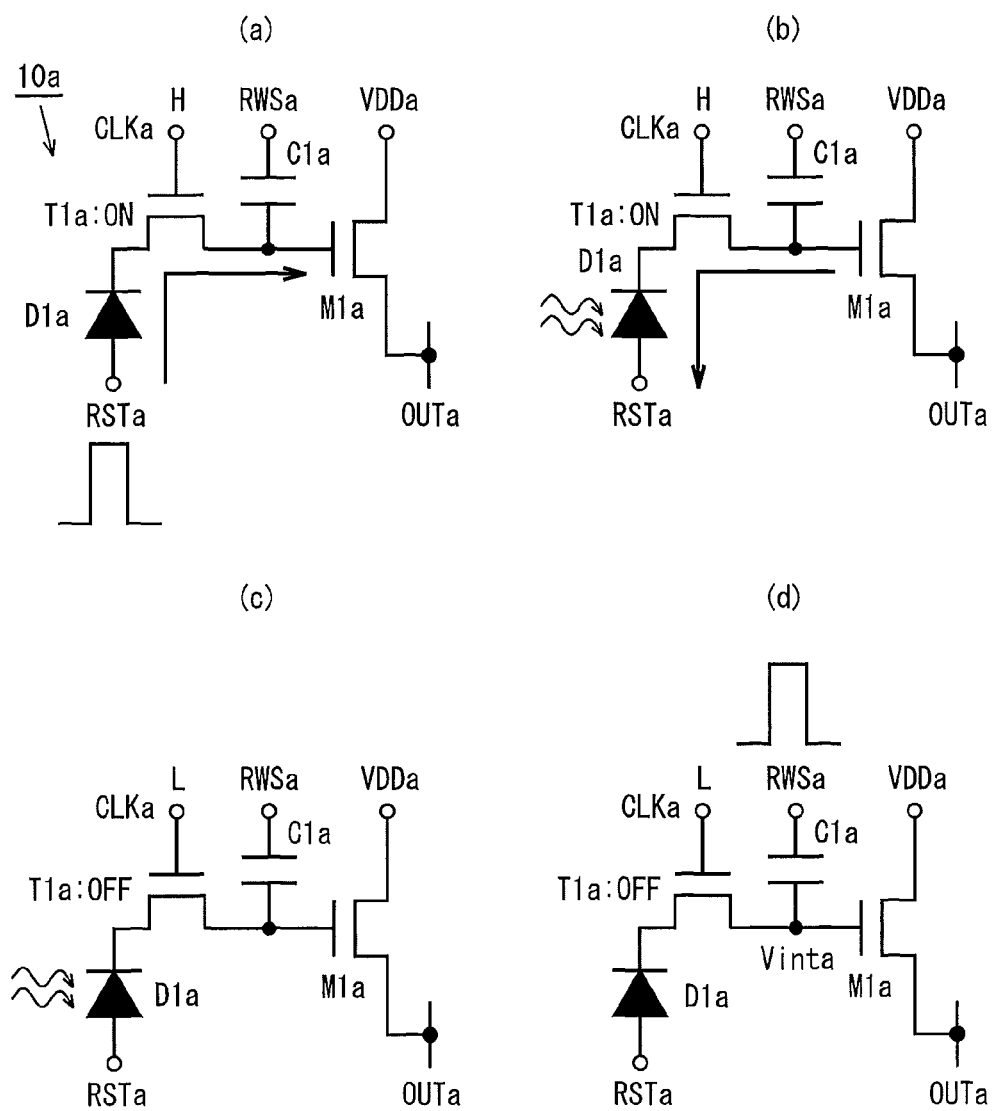
FIG. 8 illustrates the operations of one of the sensor pixel circuits of FIG. 6.

FIG. 8 illustrates the operations of the first pixel circuit 10a where it is driven by the signals shown in FIG. 4. As shown in FIG. 8, the first pixel circuit 10a performs (a) reset, (b) accumulation, (c) retention and (d) readout in one frame.

Figure 9:
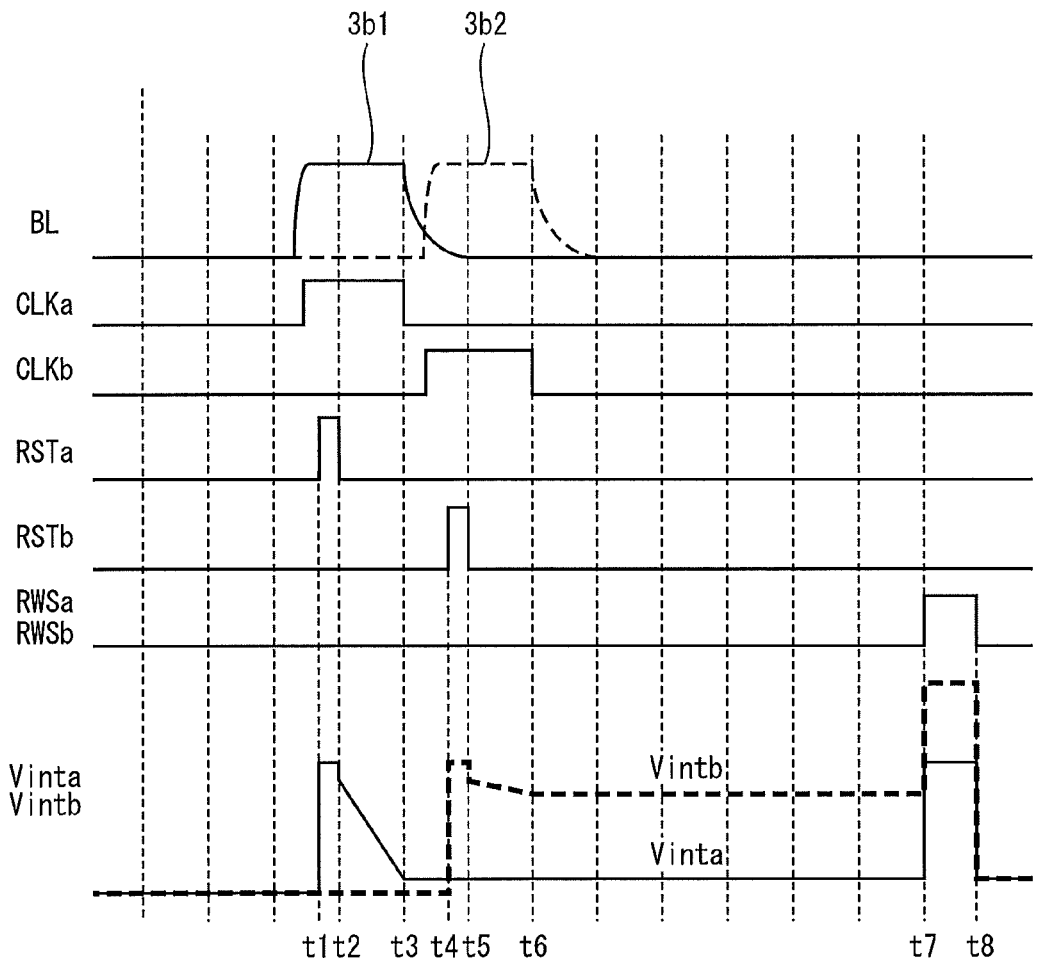
FIG. 9 is a signal waveform diagram for the sensor pixel circuits of FIG. 6.

FIG. 9 is a signal waveform diagram for the first pixel circuit 10a and second pixel circuit 10b where it is driven by the signals shown in FIG. 4. In FIG. 9, BL represents the brightness of the first infrared LED group 3b1 and second infrared LED group 3b2, Vinta the potential on the accumulation node of the first pixel circuit 10a (potential on the gate of the transistor M1a), and Vintb the potential on the accumulation node of the second pixel circuit 10b (potential on the gate of the transistor M1b). For the first pixel circuit 10a, times t1 and t2 define the reset period, times t2 and t3 the accumulation period, times t3 and t7 the retention period, and times t7 and t8 the readout period. For the second pixel circuit 10b, times t4 and t5 define the reset period, times t5 and t6 the accumulation period, times t6 and t7 the retention period, and times t7 and t8 the readout period.

During the reset period of the first pixel circuit 10a, the clock signal CLKa is high, the readout signal RWSa is low, the reset signal RSTa is high for reset. During this period, the transistor T1a is on. Consequently, a current (forward with respect to the photodiode D1a) flows from the reset line RSTa through the photodiode D1a and transistor T1a to the accumulation node (FIG. 8(a)), resetting the potential Vinta to a predetermined level.

During the accumulation period of the first pixel circuit 10a, the clock signal CLKa is high, and the reset signal RSTa and readout signal RWSa are low. During this period, the transistor T1a is on. If light impinges on the photodiode D1a during this period, a current (photocurrent of the photodiode D1a) flows from the accumulation node through the transistor T1a and photodiode D1a to the reset line RSTa, drawing charge from the accumulation node (FIG. 8(b)). Thus, the potential Vinta decreases according to the amount of light impinging on the photodiode while the clock signal CLKa is high (i.e. while the first infrared LED group 3b1 is on).

During the retention period of the first pixel circuit 10a, the clock signal CLKa, reset signal RSTa and readout signal RWSa are low. During this period, the transistor T1a is off. If light impinges on the photodiode D1a during this period, the potential Vinta does not change since the transistor T1a is off such that the photodiode D1a and the gate of the transistor M1 are electrically disconnected from each other (FIG. 8(c)).

During the readout period of the first pixel circuit 10a, the clock signal CLKa and reset signal RSTa are low, and the readout signal RWSa is high for readout. During this period, the transistor T1a is off. During this period, the potential Vinta increases by the amount of increase in the potential of the readout signal RWSa multiplied by (Cqa/Cpa), where Cpa is the capacitance of the entire first pixel circuit 10a and Cqa is the capacitance of the capacitor C1a. The transistor M1a constitutes a source follower amplifier circuit where a transistor (not shown) included in the source driver circuit 6 serves as a load, driving the output line OUTa according to the potential Vinta (FIG. 8(d)).

The second pixel circuit 10b operates in a similar manner to the first pixel circuit 10a. During the reset period, the potential Vintb is reset to a predetermined level; during the accumulation period, it decreases according to the amount of light impinging on the photodiode while the clock signal CLKb is high (i.e. while the second infrared LED group 3b2 is on), and it remains unchanged during the retention period. During the readout period, the potential Vintb increases by the amount of increase in the potential of the readout signal RWSb multiplied by (Cqb/Cpb), where Cpb is the capacitance of the entire second pixel circuit 10b and Cqb is the capacitance of the capacitor C1b, and the transistor M1b drives the output line OUTb according to the potential Vintb.

As discussed above, the first pixel circuit 10a according to the present embodiment includes one photodiode D1a (light receiving element), one accumulation node that accumulates a charge corresponding to an amount of light sensed, a transistor M1a (readout transistor) having a control terminal connected with the accumulation node, and a transistor T1a (retaining switching element) provided on the path of current passing through the photodiode D1a and is turned on and off in response to a clock signal CLK. The transistor T1a is provided between the accumulation node and one end of the photodiode D1a, and the other end of the photodiode D1a is connected with a reset line RSTa. The transistor T1a is turned on in response to a clock signal CLKa and remains on during a detection period in which the first infrared LED group 3b1 is on. The second pixel circuit 10b has a configuration similar to that of the first pixel circuit 10a, and the transistor T1b included in the second pixel circuit 10b is on during a detection period in which the second infrared LED group 3b2 is on.

Thus, in the present embodiment, a transistor T1*a* that is on during a detection period in which the first infrared LED group 3*b*1 is on may be provided on the path of current passing through the photodiode D1*a*, and a transistor T1*b* that is on during a detection period in which the second infrared LED group 3*b*2 is on may be provided on the path of current passing through the photodiode D1*b*. This provides a first pixel circuit 10*a* that detects light during a detection period in which the first infrared LED group 3*b*1 is on and memorizes the amount of detected light in other periods and a second pixel circuit 10*b* that detects light during a detection period in which the second infrared LED group 3*b*2 is on and memorizes the amount of detected light in other periods.

[Exemplary Configurations of Backlight 3]

Now, several specific exemplary configurations of the backlight 3 of the present embodiment will be described. FIGS. 10 to 14 each illustrate an exploded perspective view of an exemplary configuration of the backlight 3. FIG. 15 is a schematic cross-sectional view of the backlight 3 of FIG. 14.

In the backlight 3 of each of FIGS. 10 to 14, two lens sheets 61 and 62 and diffuser sheet 63 are provided on or above one side of the light guide plate 64 or 74, while a reflector sheet 65 or 72 is provided on the other side.

Figure 10:
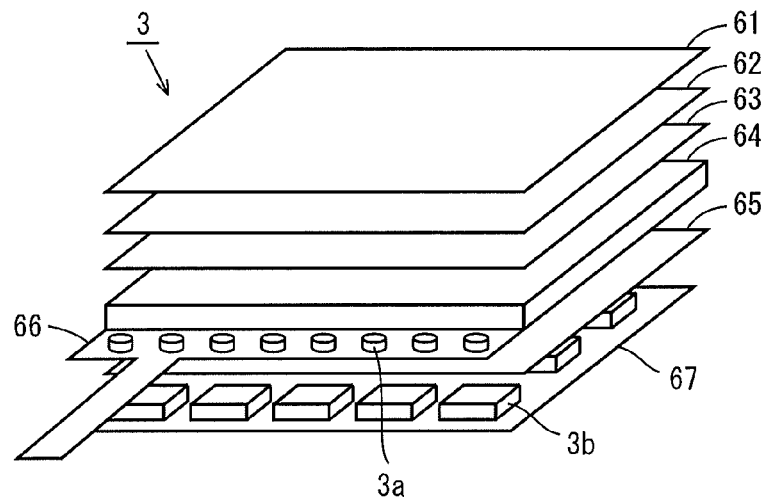
FIG. 10 is an exploded perspective view of an implementation of the backlight.

In the backlight 3 shown in FIG. 10, a flexible printed circuit board 66 with white LEDs 3*a* arranged in a one-dimensional manner is provided on a lateral face of the light guide plate 64. The infrared LEDs 3*b* are arranged on a circuit board 67 in a two-dimensional manner. The circuit board 67 is provided on the back side of the reflector sheet 65. The reflector sheet 65 is formed of a sheet that passes infrared light and reflects visible light. Such sheets may include a reflector sheet formed of a polyester-based resin, for example.

In the backlight 3 shown in FIG. 10, those of the infrared LEDs 3*b* arranged in a two-dimensional manner on the circuit board 67 that are located in the first area which covers the upper half of the pixel region 4 as viewed in a vertical direction belong to the first infrared LED group 3*b*1. Those located in the second area which covers the lower half of the pixel region 4 as viewed in a vertical direction belong to the second infrared LED group 3*b*2.

Figure 11:
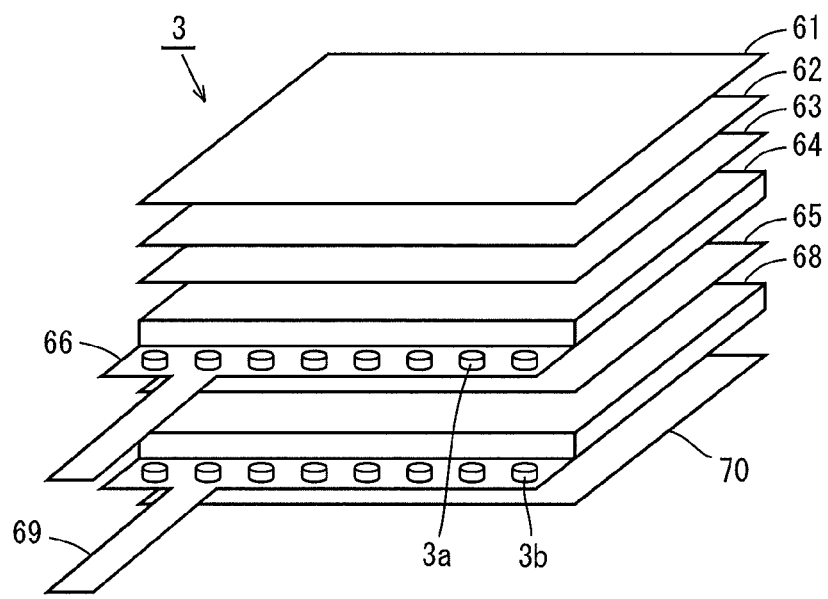
FIG. 11 is an exploded perspective view of another implementation of the backlight.

Similarly, in the backlight 3 shown in FIG. 11, a flexible printed circuit board 66 with white LEDs 3*a* arranged in a one-dimensional manner is provided on a lateral face of the light guide plate 64. In addition to the light guide plate 64, the backlight 3 shown in FIG. 11 includes another light guide plate 68. Infrared LEDs 3*b* are arranged on a flexible circuit board 69 in a one-dimensional manner and provided on a lateral face of the light guide plate 68. In the backlight 3 of FIG. 11, a reflector sheet 70 is provided on the back side of the light guide plate 68. The reflector sheet 70 is formed of a sheet that reflects infrared light.

In the backlight 3 shown in FIG. 11, a light guide plate 68, infrared LEDs 3*b*, flexible printed circuit board 69 and reflector sheet 70 may be added to a backlight that uses white LEDs 3*a* as light sources to emit visible light (i.e. from the lens sheet 61 to the reflector sheet 65) to provide a backlight 3 that emits both visible and infrared light using a visible light backlight configuration.

In the backlight 3 shown in FIG. 11, those of the infrared LEDs 3*b* arranged in a one-dimensional manner on the flexible printed circuit board 69 that are located so as to cause light to enter the first area which covers the upper half of the pixel region 4 as viewed in a vertical direction belong to the first infrared LED group 3*b*1. Those located so as to cause light to enter the second area which covers the lower half of the pixel region 4 as viewed in a vertical direction belong to the second infrared LED group 3*b*2.

Figure 12:
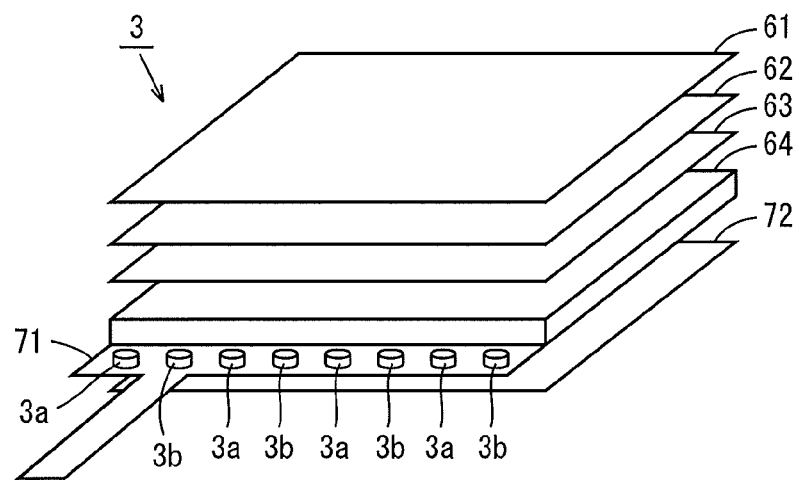
FIG. 12 is an exploded perspective view of yet another implementation of the backlight.

In the backlight 3 shown in FIG. 12, a flexible printed circuit board 71 with white LEDs 3*a* and infrared LEDs 3*b* mixed together and arranged in a one-dimensional manner is provided on a lateral face of the light guide plate 64. The white LEDs 3*a* and infrared LEDs 3*b* may be arranged on the flexible printed circuit board 71 in an alternated manner. The reflector sheet 72 may be a sheet that reflects both visible and infrared light. Thus, white LEDs 3*a* and infrared LEDs 3*b* may be mixed together and located along a lateral face of the light guide plate 64 to provide a backlight 3 that emits both visible and infrared light using something similar to a visible light backlight configuration.

In the backlight 3 shown in FIG. 12, those of the infrared LEDs 3*b* arranged in a one-dimensional manner on the flexible printed circuit board 71 that are located so as to cause light to enter the first area which covers the upper half of the pixel region 4 as viewed in a vertical direction belong to the first infrared LED group 3*b*1. Those located so as to cause light to enter the second area which covers the lower half of the pixel region 4 as viewed in a vertical direction belong to the second infrared LED group 3*b*2.

Figure 13:
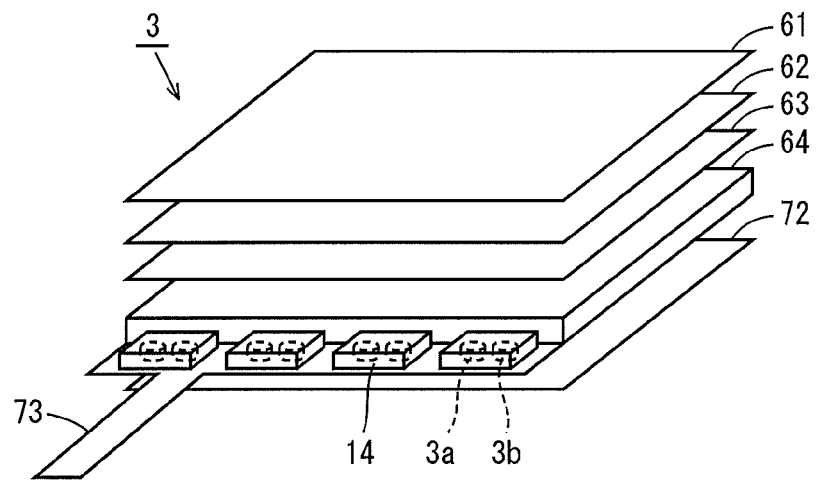
FIG. 13 is an exploded perspective view of still another implementation of the backlight.

In the backlight 3 shown in FIG. 13, a white LED 3*a* and infrared LED 3*b* are encapsulated in a single resin package 14. A flexible printed circuit board 73 with such resin packages 14 arranged in a one-dimensional manner is provided on a lateral face of the light guide plate 64. Thus, white LEDs 3*a* and infrared LEDs 3*b* may be encapsulated in resin packages 14 to allow multiple LED emitters to be located in a small space. It should be noted that one or more white LEDs 3*a* and one or more infrared LEDs 3*b* may be encapsulated in a single resin package 14.

In the backlight 3 shown in FIG. 13, those of the infrared LEDs 3*b* arranged on the flexible printed circuit board 73 that are located so as to cause light to enter the first area which covers the upper half of the pixel region 4 as viewed in a vertical direction belong to the first infrared LED group 3*b*1. Those located so as to cause light to enter the second area which covers the lower half of the pixel region 4 as viewed in a vertical direction belong to the second infrared LED group 3*b*2.

Figure 14:
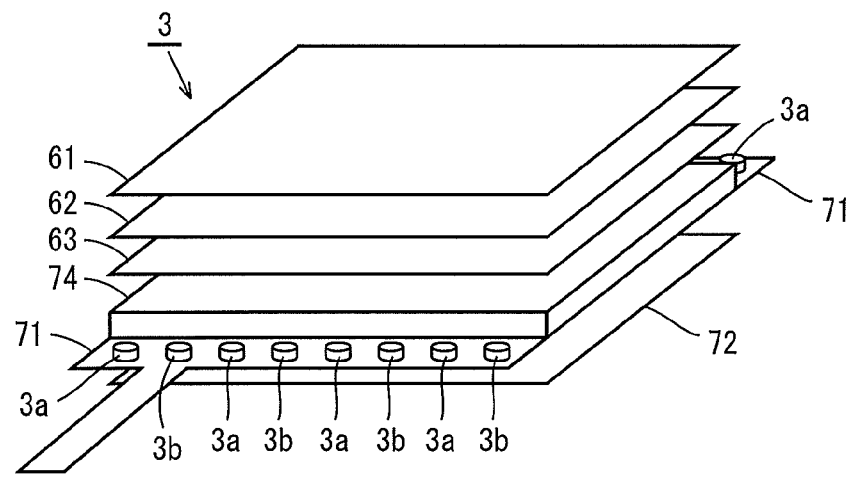
FIG. 14 is an exploded perspective view of yet another implementation of the backlight.
Figure 15:
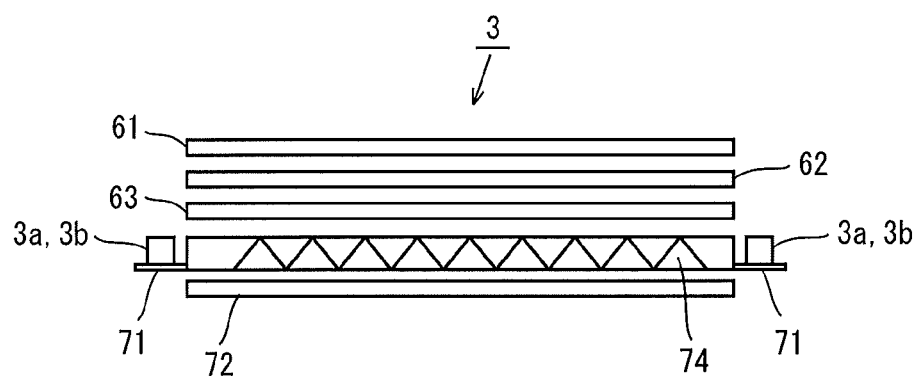
FIG. 15 is a schematic cross-sectional view of the backlight of FIG. 14.

In the backlight 3 shown in FIG. 14, a flexible printed circuit board 71 with white LEDs 3*a* and infrared LEDs 3*b* mixed together and arranged in a one-dimensional manner is provided on one lateral face of the light guide plate 74. Another flexible printed circuit board 71 with white LEDs 3*a* and infrared LEDs 3*b* mixed together and arranged in a one-dimensional manner is provided on the lateral face of the light guide plate 74 opposite the one lateral side above.

In the backlight 3 shown in FIG. 14, those of the infrared LEDs 3*b* arranged on the flexible printed circuit board 71 that are located so as to cause light to enter the first area which covers the upper half of the pixel region 4 as viewed in a vertical direction belong to the first infrared LED group 3*b*1. Those located so as to cause light to enter the second area which covers the lower half of the pixel region 4 as viewed in a vertical direction belong to the second infrared LED group 3*b*2.

FIG. 15 is a cross-sectional view of the backlight 3 of FIG. 14. The light guide plate 74 is treated so as to be capable of conveying white light and infrared light entering it from one lateral face and white light and infrared light entering it from the other lateral face. Thus, white LEDs 3*a* and infrared LEDs 3*b* are located along two opposite lateral faces of the light guide plate 74 such that these two types of LEDs share the light guide plate 74 and other backlight components. This realizes, in a more compact manner, a backlight 3 that emits both visible light and infrared light.

[Configuration of Backlight Control Circuit 13]

Figure 16:
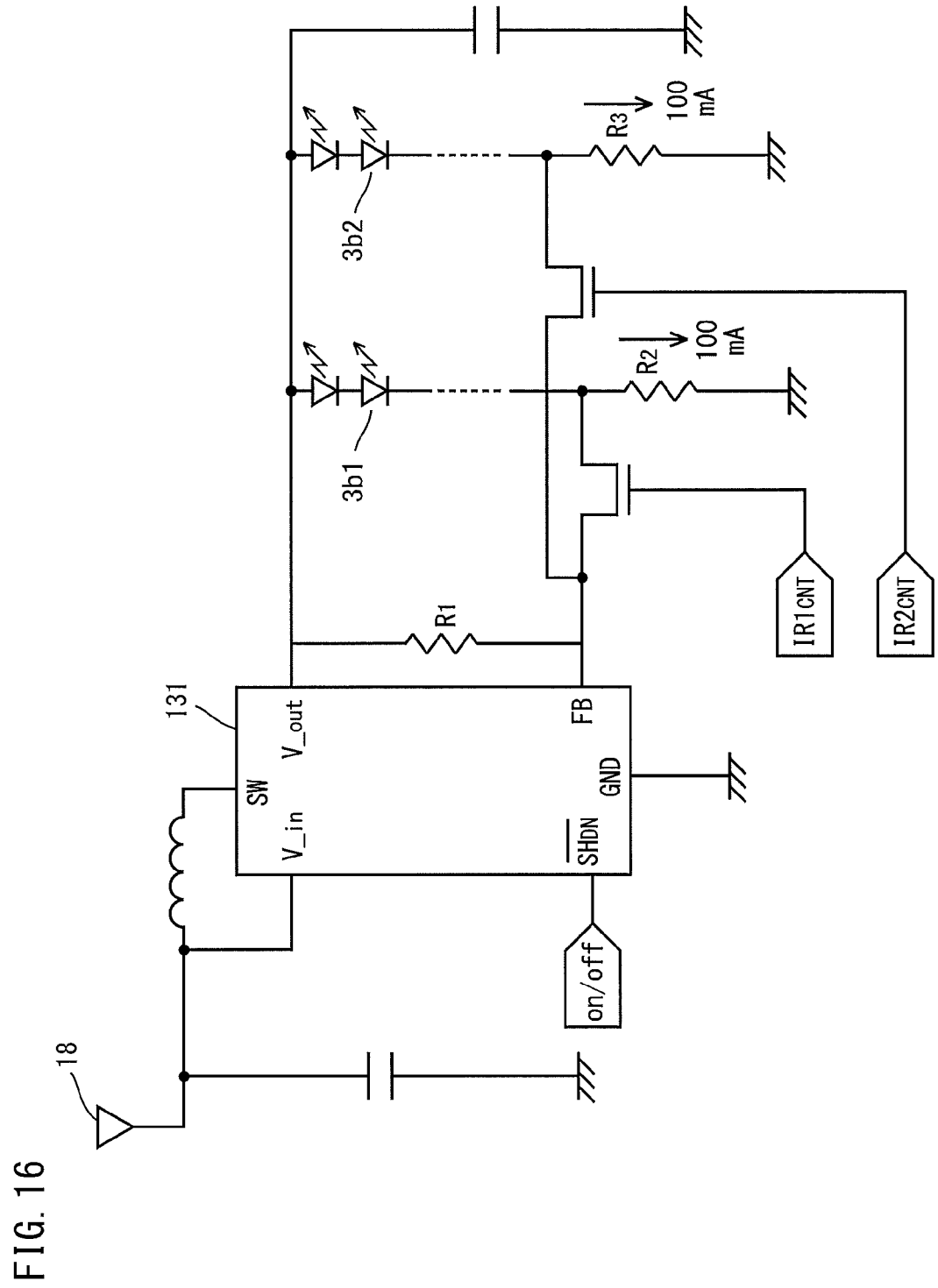
FIG. 16 is a circuit diagram illustrating a circuit for controlling on and off of the infrared LEDs in the backlight control circuit.

An exemplary configuration of the backlight control circuit 13 will now be described. FIG. 16 is a circuit diagram illustrating a circuit in the backlight control circuit 13 for controlling on and off of the infrared LEDs 3b. As shown in FIG. 16, the backlight control circuit 13 receives a voltage supply from an external power supply 18. The backlight control circuit 13 includes a power supply control circuit 131 and switching elements 132a and 132b. The on/off signal, $IR1_{CNT}$ signal and $IR2_{CNT}$ signal shown in FIG. 16, which implement the control signal CSb of FIG. 1, are fed into the backlight control circuit 13.

The on/off signal controls on and off of the power supply control circuit 131. The $IR1_{CNT}$ signal is imposed on the gate electrode of the switching element 132a to control on and off of the switching element 132a. The $IR2_{CNT}$ signal is imposed on the gate electrode of the switching element 132b to control on and off of the switching element 132b. The source electrode of the switching element 132a is connected with the resistor R2. The source electrode of the switching element 132b is connected with the resistor R3. The drain electrodes of the switching elements 132a and 132b are connected with the FB terminal of the backlight control circuit 13.

Figure 17:
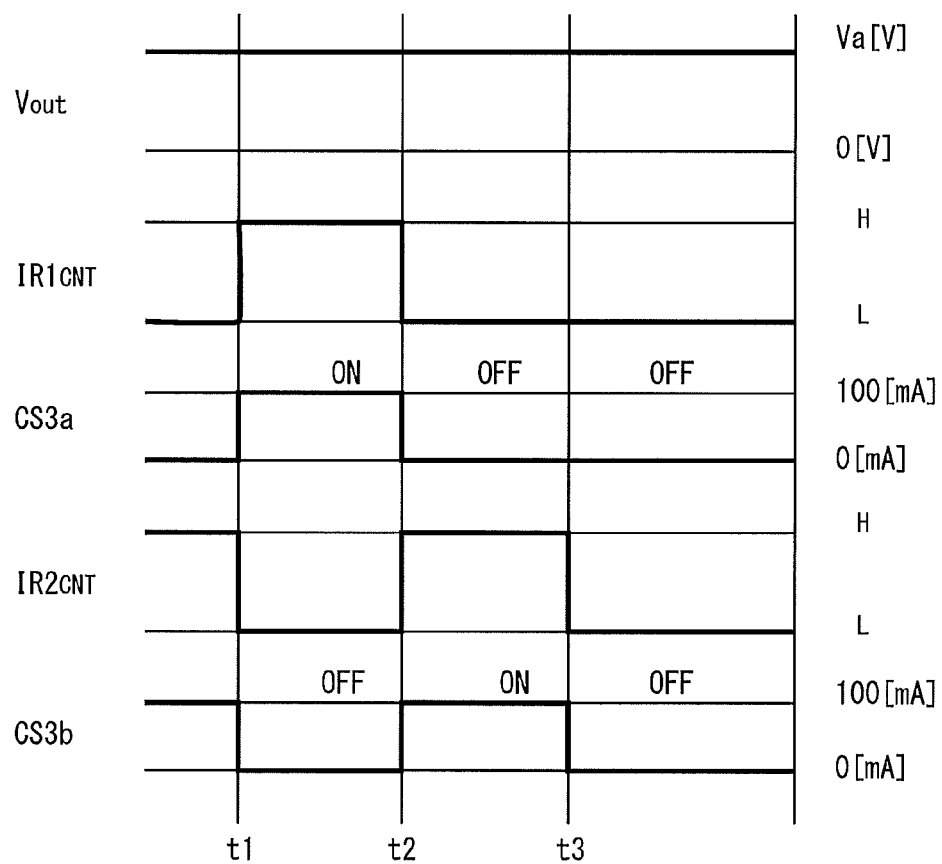
FIG. 17 is a timing chart illustrating the operations of the backlight control circuit.

FIG. 17 is a timing chart illustrating the operations of the backlight control circuit 13. As shown in FIG. 17, a constant voltage Va [V] is constantly applied to the anodes of the first infrared LED group 3b1 and second infrared LED group 3b2 from the output terminal (V_out) of the power supply control circuit 131. From time t1 to time t2, the $IR1_{CNT}$ signal is high and thus the switching element 132a is on such that the value of the drive current CS3b1 supplied to the first infrared LED group 3b1 is at a high level (100 [mA] in this example). Thus, the first infrared LED group 3b1 is on. During this period, the $IR2_{CNT}$ signal is low and thus the switching element 132b is off such that the value of the drive current CS3b2 supplied to the second infrared LED group 3b2 is at a low level (0 [mA] in this example). Thus, the second infrared LED group 3b is off. The period from time t1 to time t2 corresponds to period A1, from time ta to time tb, shown in FIG. 3.

On the contrary, at time t2, the $IR2_{CNT}$ signal switches from low to high level while the $IR1_{CNT}$ signal switches from high to low level. Thus, the value of the drive current CS3b1 supplied to the first infrared LED group 3b1 is at a low level (0 [mA] in this example) while the value of the drive current CS3b2 supplied to the second infrared LED group 3b2 is at a high level (100 [mA] in this example). Thus, from time t2 to time t3, the first infrared LED group 3b1 is off and the second infrared LED group 3b2 is on. The period from time t2 to time t3 corresponds to period A2, from time tb to time tc, shown in FIG. 3.

At time t3, the $IR2_{CNT}$ signal switches from high to low level while the $IR1_{CNT}$ signal remains low. Thus, from time t3 onward, the infrared LEDs 3b are all off.

Thus, the backlight control circuit 13 of the present embodiment is capable of turning on and off both the first infrared LED group 3b1 and second infrared LED group 3b2 using a single power supply control circuit 131. Thus, the circuit configuration is smaller than with two individual circuits that separately drive and control the first infrared LED group 3b1 and second infrared LED group 3b2.

As discussed above, according to the present embodiment, a plurality of sensor pixel circuits 9 in the pixel region 4 are divided in space into two groups, i.e. first sensor pixel circuits 9a located in a first area that covers the upper half of the pixel region 4 as viewed in a vertical direction and second sensor pixel circuits 9b located in a second area that covers the lower half of the region. The infrared LEDs 3b of the backlight 3 are divided into a first infrared LED group 3b1 that illuminates the first sensor pixel circuits 9a and a second infrared LED group 3b2 that illuminates the second sensor pixel circuits 9b. The first infrared LED group 3b1 and second infrared LED group 3b2 are controlled such that they are on during different time periods (periods A1 and A2) within one frame.

Thus, the period in which the first infrared LED group 3b1 is on (period A1) and the period in which the second infrared LED group 3b2 is on (period A2) does not overlap each other, thereby reducing current supplied to the backlight 3 in each of these periods compared with an implementation where all the infrared LEDs 3b are on at once. In other words, the number of infrared LEDs that are on at once is halved compared with an implementation where all the infrared LEDs 3b are on at once, thereby increasing brightness at a given moment in a given area. Further, a large momentary current supply, which is necessary in an implementation where all the infrared LEDs 3b are on at once, is not required, thereby preventing decrease in battery life.

In the above description, the direction in which the gate lines GL1 to GLx are arranged (i.e. a direction perpendicular to the direction in which the gate lines GL extend) is referred to as a vertical direction, and the sensor pixel circuits 9 located in the upper half as viewed in such a vertical direction are referred to as first sensor pixel circuits 9a while the sensor pixel circuits 9 located in the lower half are referred to as second sensor pixel circuits 9b. However, the manner in which the sensor pixel circuits 9 in the pixel region 4 are divided is not limited to this example.

Figure 18A:
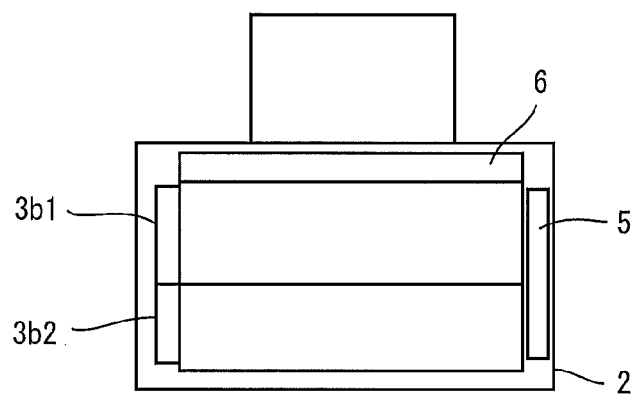
FIG. 18A is a layout of the first and second sensor pixel circuits according to the first embodiment.

In this way, in the present embodiment, a plurality of sensor pixel circuits 9 in the pixel region 4 are divided into first sensor pixel circuits 9a and second sensor pixel circuits 9b, the two sets arranged in a direction in which the gate lines GL are arranged. As shown in FIG. 18A, the gate driver circuit 5 may be located along a short side of the display panel 2, and the long sides of the display panel 2 may be parallel to the gate lines GL. Alternatively, as shown in FIG. 18B, the gate driver circuit 5 may be located along a long side of the display panel 2, and the short sides of the display panel 2 may be parallel to the gate lines GL.

In the implementation shown in FIG. 18A, the sensor pixel circuits 9 are divided into first sensor pixel circuits 9a and second sensor pixel circuits 9b, the two sets arranged in a direction of the short sides of the display panel 2 (i.e. a direction in which the gate lines GL are arranged). In this configuration, sensor outputs may be read out from all the sensor pixel circuits by performing one readout operation in a frame.

Figure 18B:
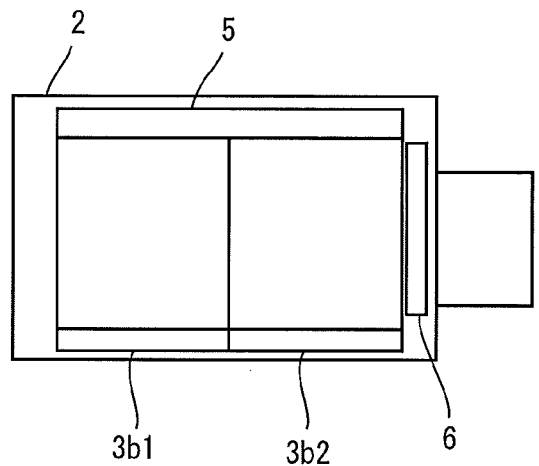
FIG. 18B is another layout of the first and second sensor pixel circuits according to the first embodiment.

In the implementation shown in FIG. 18B, the sensor pixel circuits 9 are divided into first sensor pixel circuits 9a and second sensor pixel circuits 9b, the two sets arranged in a direction of the long sides of the display panel 2 (i.e. a direction in which the gate lines GL are arranged). In this implementation, too, sensor outputs may be read out from all the sensor pixel circuits by performing one readout operation in a frame. In this configuration, the infrared LEDs 3b are preferably located along a side of the pixel region 4 opposite that with the gate driver circuit 5. Thus, light propagates in a direction parallel to the short sides of the display panel 2, leading to reduced variation in amount of light within the interface between the area illuminated by the first infrared LED group 3b1 and the area illuminated by the second infrared LED group 3b2, resulting in reduced loss of light.

In the above description, the sensor pixel circuits 9 are divided into two groups, i.e. first sensor pixel circuits 9a and second sensor pixel circuits 9b, while the infrared LEDs 3b are divided into first infrared LED group 3b1 and second infrared LED group 3b2. These first infrared LED group 3b1 and second infrared LED group 3b2 are operated such that they are on during different time periods in synchronization with the sensing of the first sensor pixel circuits 9a and second sensor pixel circuits 9b.

However, the number of groups into which the sensor pixel circuits 9 and infrared LEDs 3b are divided is not limited to two, as in the above implementation, and the circuits and LEDs may be divided into three or more groups.

Second Embodiment

A second embodiment of the present invention will be described below. The same features that are described in the first embodiment will be labeled with the same reference numerals as in the first embodiment and their detailed description will be omitted.

In the display device according to the second embodiment, the sensor pixel circuits are divided in a manner different from that for the first embodiment. That is, in the first embodiment, a plurality of sensor pixel circuits 9 in the pixel region 4 are divided into two groups arranged in a direction in which the gate lines GL are arranged. In the second embodiment, the sensor pixel circuits 9 are additionally divided into two groups arranged in a direction in which the source lines SL are arranged. As such, the sensor pixel circuits 9 are divided into four groups in total.

Figure 19:
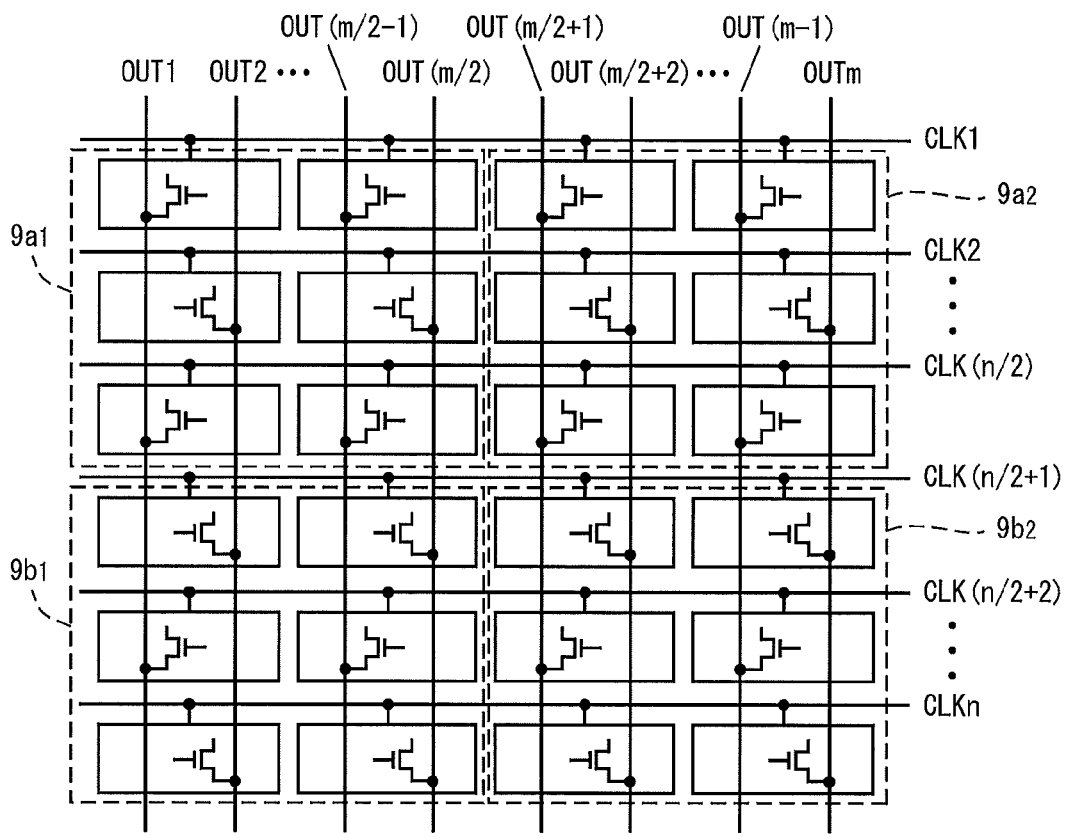
FIG. 19 illustrates an arrangement of sensor pixel circuits in a pixel region of a second embodiment.

FIG. 19 shows an arrangement of the sensor pixel circuits 9 in the pixel region 4 of the second embodiment. In the present embodiment, as shown in FIG. 19 where the pixel region 4 is divided into four parts in total, i.e. two columns and two rows, out of the (n×m/2) sensor pixel circuits 9 in the pixel region 4, one fourth, i.e. (n×m/8) first sensor pixel circuits 9a1, are located in the top-left part. In other words, the first sensor pixel circuits 9a1 are each located in the vicinity of the intersection of one of the clock lines CLK1 to CLK(n/2) and one of the output lines OUT1 to OUT(m/2).

Similarly, where the pixel region 4 is divided into four parts in total, i.e. two columns and two rows, (n×m/8) second sensor pixel circuits 9b1 are located in the bottom-left part of the region. In other words, the second sensor pixel circuits 9b1 are each located in the vicinity of the intersection of one of the clock lines CLK(n/2+1) to CLKn and one of the output lines OUT1 to OUT(m/2).

Similarly, where the pixel region 4 is divided into four parts in total, i.e. two columns and two rows, (n×m/8) third sensor pixel circuits 9a2 are located in the top-right part of the region. In other words, the third sensor pixel circuits 9a2 are each located in the vicinity of the intersection of one of the clock lines CLK1 to CLK(n/2) and one of the output lines OUT(m/2+1) to OUTm.

Similarly, where the pixel region 4 is divided into four parts in total, i.e. two columns and two rows, (n×m/8) fourth sensor pixel circuits 9b2 are located in the bottom-right part of the region. In other words, the third sensor pixel circuits 9b2 are each located in the vicinity of the intersection of one of the clock lines CLK(n/2+1) to CLKn and one of the output lines OUT(m/2+1) to OUTm.

In the present embodiment, a direct-type backlight 3 as shown in FIG. 10 in connection with the first embodiment is used. In the present embodiment, in such a direct-type backlight 3, the group of infrared LEDs that illuminate, from directly below, the area where the first sensor pixel circuits 9a1 are located is referred to as a first infrared LED group 3ba1. The group of infrared LEDs that illuminate, from directly below, the area where the second sensor pixel circuits 9b1 are located is referred to as a second infrared LED group 3bb1. The group of infrared LEDs that illuminate, from directly below, the area where the third sensor pixel circuits 9a2 are located is referred to as a third infrared LED group 3ba2. The group of infrared LEDs that illuminate, from directly below, the area where the fourth sensor pixel circuits 9b2 are located is referred to as a fourth infrared LED group 3bb2.

Figure 20:
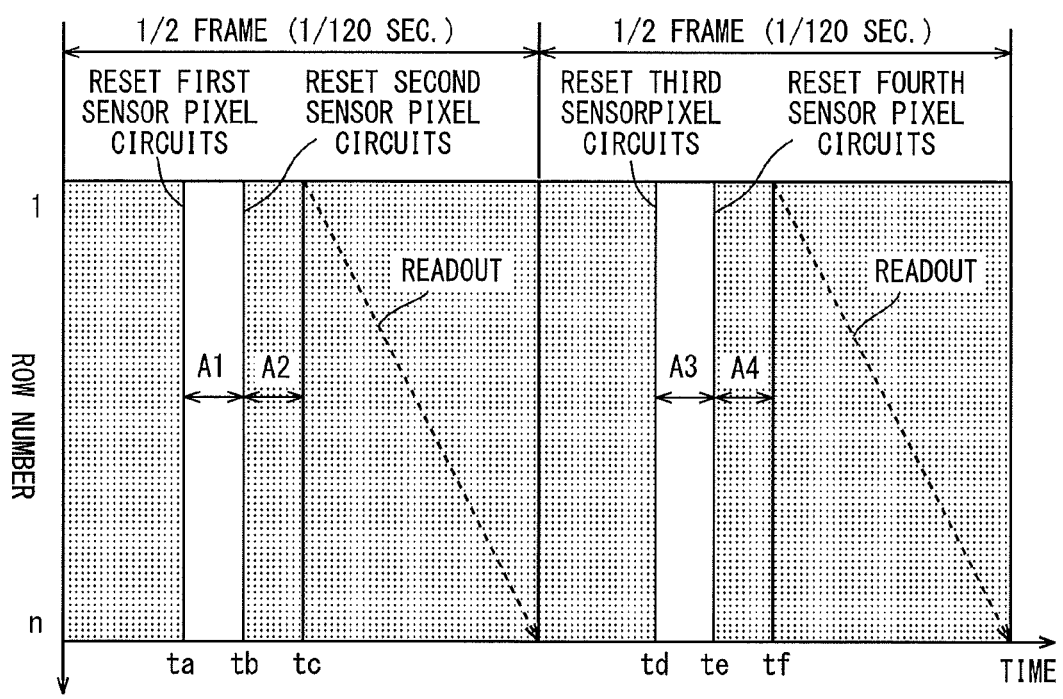
FIG. 20 illustrates the timing of on and off of first to fourth infrared LED groups according to the second embodiment, as well as the timing of resetting and readout of the sensor pixel circuits.

FIG. 20 illustrates the timing of on and off of the first to fourth infrared LED groups of the present embodiment, as well as the timing of resetting and readout of the sensor pixel circuits 9. In the implementation shown in FIG. 20, each of the first infrared LED group 3ba1, second infrared LED group 3bb1, third infrared LED group 3ba2 and fourth infrared LED group 3bb2 is turned on once in ½ frame, where it remains on for a predetermined period of time, and is otherwise off. Specifically, the first infrared LED group 3ba1 is turned on at time ta, which is in the first half of a frame, and is turned off at time tb. The second infrared LED group 3bb1 is turned on at time tb and turned off at time tc. All the first sensor pixel circuits 9a1 are reset at time ta, and all the second sensor pixel circuits 9b1 are reset at time tb.

The first sensor pixel circuits 9a1 detect light that enters them during period A1, from time ta to time tb, in the first half of a frame (i.e. a period in which the first infrared LED group 3ba1 is on). The second sensor pixel circuits 9b1 detect light that enters them during period A2, from time tb to time tc (i.e. a period in which the second infrared LED group 3bb1 is on). Periods A1 and A2 are equally long. The first sensor pixel circuits 9a1 and second sensor pixel circuits 9b1 are read in the first half of a frame, from time tc onward, in parallel and in a line-sequential manner. Although in FIG. 20 readout of the first sensor pixel circuits 9a1 and second sensor pixel circuits 9b1 is completed in the first ½ of the frame, it is sufficient if readout is completed by the time the third pixel circuits 9ba2 are reset in the second ½ of the frame.

The third sensor pixel circuits 9a2 detect light that enters them during period A3, from time td to time te in the second half of a frame (i.e. a period in which the third infrared LED group 3ba2 is on). The fourth sensor pixel circuits 9b2 detect light that enters them during period A4, from time te to time tf (i.e. a period in which the fourth infrared LED group 3bb2 is on). Periods A3 and A4 are as long as periods A1 and A2. The third sensor pixel circuits 9a2 and fourth sensor pixel circuits 9b2 are read in the second half of a frame, from time tf onward, in parallel and in a line-sequential manner. Although in FIG. 20 readout of the third sensor pixel circuits 9a2 and fourth sensor pixel circuits 9b2 is completed in the second ½ of the frame, it is sufficient if readout is completed by the time the first sensor pixel circuits 9ba1 are reset in the first ½ of the next frame.

Thus, in the present embodiment, the sensor pixel circuits 9 are divided into a plurality of groups arranged not only in a direction in which the gate lines GL are arranged but also in a direction in which the source lines SL are arranged, such that the sensor pixel circuits 9 in the pixel region 4 are divided into four or more groups. Further, the infrared LEDs 3b are divided into the same number of groups, corresponding to the groups of the sensor pixel circuits 9. Then, these groups of infrared LEDs 3b are operated such that they are on during different time periods, thereby reducing current supplied to the backlight 3 in each of these periods compared with an implementation where all the infrared LEDs 3b are on at once. In other words, fewer infrared LEDs are on at once than in an implementation where all the infrared LEDs 3b are on at once, thereby increasing brightness at a given moment in a given area. Further, a large momentary current supply, which is necessary in an implementation where all the infrared LEDs 3*b* are on at once, is not required, thereby preventing decrease in battery life.

The present embodiment has illustrated an implementation where the sensor pixel circuits 9 are divided into a plurality of groups arranged in both a direction in which the gate lines GL are arranged and a direction in which the source lines SL are arranged. However, it is not necessary that the sensor pixel circuits 9 are divided into sets arranged in a direction in which the gate lines GL are arranged. That is, the sensor pixel circuits 9 may only be divided into two or more groups arranged in a direction in which the source lines SL are arranged.

Third Embodiment

The third embodiment of the present invention will be described below. The same features that are described in the first and second embodiments will be labeled with the same reference numerals as in these embodiments and their description will be omitted.

The display device according to the third embodiment is different from that of the first embodiment in that each sensor pixel circuit 9 includes an off-sensor pixel circuit that only detects noise components by performing sensing while no infrared LEDs 3*b* are on. Noise components may be removed from output signals from the sensor pixel circuits 9 by subtracting the output signals from the off-sensor pixel circuits from output signals from the sensor pixel circuits 9.

Figure 21:
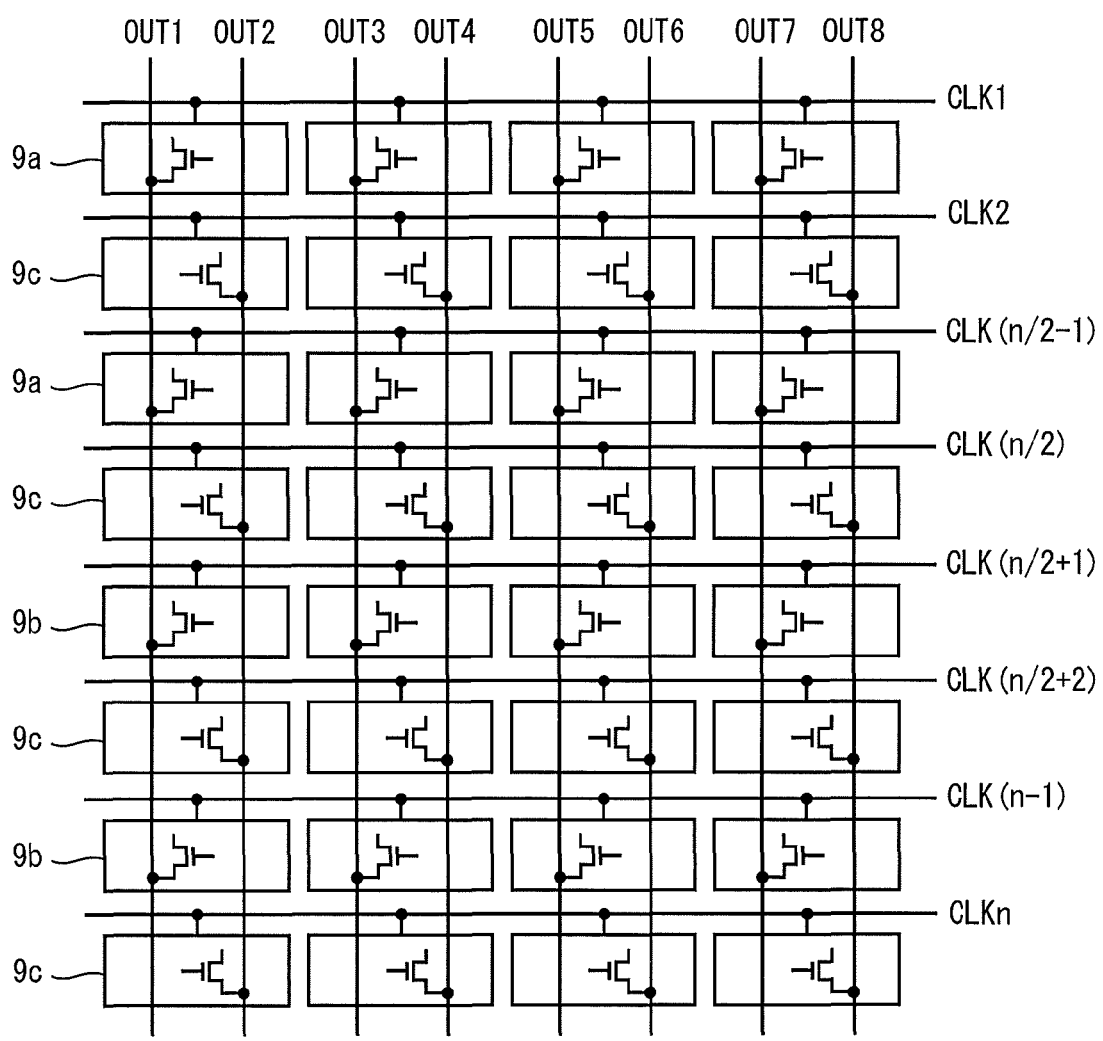
FIG. 21 illustrates an arrangement of sensor pixel circuits in a pixel region of a third embodiment.

FIG. 21 illustrates an arrangement of sensor pixel circuits 9 in the pixel region 4 of the third embodiment. (n×m/2) sensor pixel circuits 9 include first sensor pixel circuits 9*a* that detect light entering them while the first infrared LED group 3*b*1 is on, second sensor pixel circuits 9*b* that detect light entering them while the second infrared LED group 3*b*2 is on, and off-sensor pixel circuits 9*c* that detect light entering them while the infrared LEDs 3*b* are off.

The same number of first sensor pixel circuits 9*a* and second sensor pixel circuits 9*b* are provided. In an area illuminated by the first infrared LED group 3*b*1, the same number of first sensor pixel circuits 9*a* and off-sensor pixel circuits 9*c* are provided. In an area illuminated by the second infrared LED group 3*b*2, the same number of second sensor pixel circuits 9*b* and off-sensor pixel circuits 9*c* are provided.

In FIG. 21, in the upper half of the pixel region 4 as viewed in a vertical direction, i.e. in an area where the clock lines CLK1 to CLK(n/2) are located, (n×m/8) first sensor pixel circuits 9*a* are each located in the vicinity of the intersection of an odd-numbered one of the clock lines CLK1 to CLK(n/2−1) and an odd-numbered one of the output lines OUT1 to OUT(m−1). In the upper half of the pixel region 4 as viewed in a vertical direction, i.e. in an area where the clock lines CLK1 to CLK(n/2) are located, (n×m/8) off-sensor pixel circuits 9*c* are each located in the vicinity of the intersection of an even-numbered one of the clock lines CLK2 to CLK(n/2) and an odd-numbered one of the output lines OUT1 to OUT(m−1).

In the lower half of the pixel region 4 as viewed in a vertical direction, i.e. in an area where the clock lines CLK(n/2+1) to CLKn are located, (n×m/8) second sensor pixel circuits 9*b* are each located in the vicinity of the intersection of an odd-numbered one of the clock lines CLK(n/2+1) to CLK(n−1) and an odd-numbered one of the output lines OUT1 to OUT(m−1). In the lower half of the pixel region 4 as viewed in a vertical direction, i.e. in an area where the clock lines CLK(n/2+1) to CLKn are located, (n×m/8) off-sensor pixel circuits 9*c* are each located in the vicinity of the intersection of an even-numbered one of the clock lines CLK(n/2+2) to CLKn and an odd-numbered one of the output lines OUT1 to OUT(m−1).

The configuration of each sensor pixel circuit 9 of the present embodiment (first sensor pixel circuit 9*a*, second sensor pixel circuit 9*b* and off-sensor pixel circuit 9*c*) is the same as that illustrated with reference to FIGS. 6 to 9 with respect to the first embodiment, and thus its description will be omitted.

In this manner, first sensor pixel circuits 9*a* and off-sensor pixel circuits 9*c* are alternately arranged in a vertical direction in the upper half of the pixel region 4 as viewed in a vertical direction, while second sensor pixel circuits 9*b* and off-sensor pixel circuits 9*c* are alternately arranged in the lower half of the region. Thus, if two readout lines RWS are selected to be read during a readout period, sensor signals will be read from, for example, the first sensor pixel circuits 9*a* connected with the readout line RWS1 and the off-sensor pixel circuits 9*c* connected with the readout line RWS2 at the same time.

The source driver circuit 6 of the present embodiment includes a difference circuit (not shown) that calculates the differences between output signals from the first sensor pixel circuits 9*a* and output signals from the off-sensor pixel circuits 9*c* as well as the differences between output signals from the second sensor pixel circuits 9*b* and output signals from the off-sensor pixel circuits 9*c*. The source driver circuit 6 amplifies the differences in the amount of light calculated by the difference circuit and outputs the amplified signals, i.e. a sensor output Sout, to the outside of the display panel 2. The sensor output Sout is processed as necessary by a signal processing circuit 20, provided outside the display panel 2. Thus, the source driver circuit 6 and sensor row driver circuit 7 are used to read sensor signals from all the sensor pixel circuits 9, thereby allowing light entering the display panel 2 to be detected.

The area where the first sensor pixel circuits 9*a* are located, i.e. the upper half of the pixel region 4 as viewed in a vertical direction, is illuminated by the first infrared LED group 3*b*1. The area where the second sensor pixel circuits 9*b* are located, i.e. the lower half of the pixel region 4 as viewed in a vertical direction, is illuminated by the second infrared LED group 3*b*2.

Figure 22:
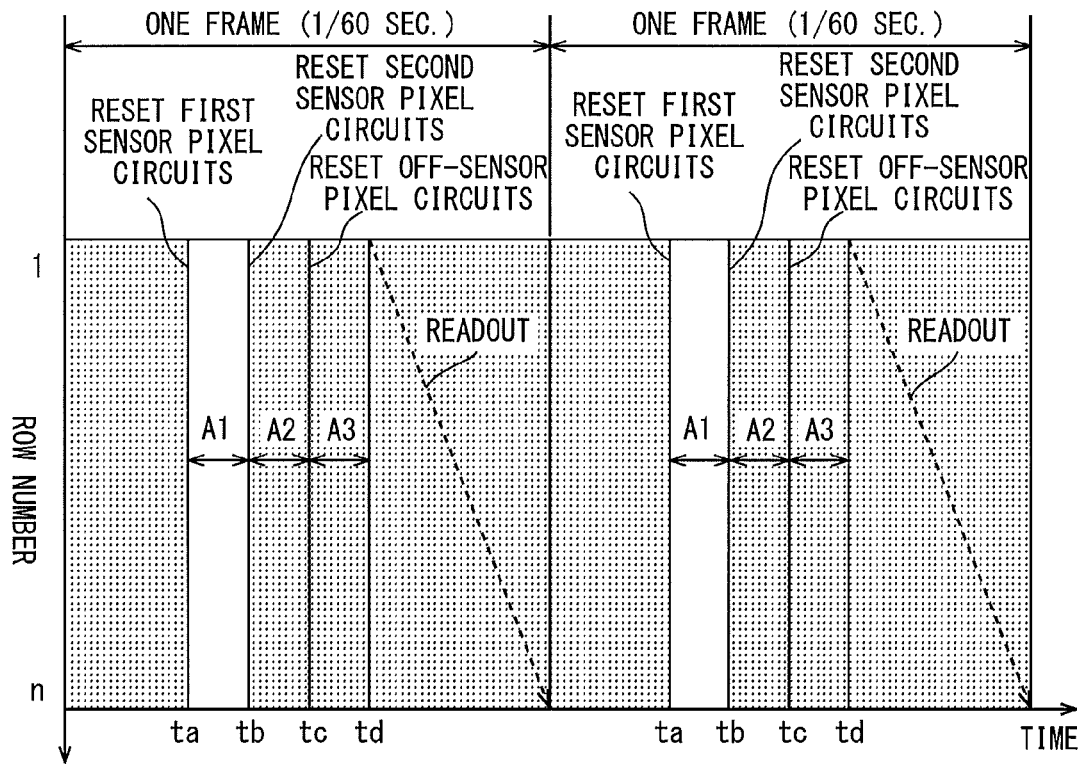
FIG. 22 illustrates the timing of on and off of first and second infrared LED groups, as well as the timing of resetting and readout of the sensor pixel circuits.

FIG. 22 illustrates the timing of on and off of the first infrared LED group 3*b*1 and second infrared LED group 3*b*2, as well as the timing of resetting and readout of the sensor pixel circuits 9. In the example of FIG. 22, each of the first infrared LED group 3*b*1 and second infrared LED group 3*b*2 is turned on once in a frame and remains on for a predetermined period, and is otherwise off. Specifically, the first infrared LED group 3*b*1 is turned on at time ta in a given frame and turned off at time tb. All the first sensor pixel circuits 9*a* are reset at time ta and all the second sensor pixel circuits 9*b* are reset at time tb. All the off-sensor pixel circuits 9*c* are reset at time tc.

The first sensor pixel circuits 9*a* detect light entering them in period A1, from time ta to time tb (i.e. the period in which the first infrared LED group 3*b*1 is on). The second sensor pixel circuits 9*b* detect light entering them during period A2, from time tb to time tc (i.e. the period in which the second infrared LED group 3*b*2 is on). The off-sensor pixel circuits 9*c* detect light entering them during period A3, from time tc to time td (i.e. the period in which the infrared LEDs 3*b* are off). During period A3, the infrared LEDs 3*b* are not on such that the current accumulated in the off-sensor pixel circuits 9*c* in A3 only contains noise components. Periods A1, A2 and A3 are equally long. The first sensor pixel circuits 9*a*, second sensor pixel circuits 9*b* and off-sensor pixel circuits 9*c* are read in parallel and in a line-sequential manner from time td onward. Although in FIG. 22 readout of the sensor pixel circuits 9 is completed within a frame, it is sufficient if readout is completed by the time the first sensor pixel circuits 9a are reset in the next frame.

In the example of FIG. 22, the sensor pixel circuits 9c are reset and detect light after the first sensor pixel circuits 9a and second sensor pixel circuits 9b are reset and detect light. However, the sensor pixel circuits 9c may be reset and detect light before the first sensor pixel circuits 9a and second sensor pixel circuits 9b are reset and detect light.

Using these operations, during a readout period, a sensor signal is read out from each of the first sensor pixel circuits 9a corresponding to the amount of light entering it during a detection period in which the first infrared LED group 3b1 is on (period A1). A sensor signal is read out from each of the second sensor pixel circuits 9b corresponding to the amount of light entering it during a detection period in which the second infrared LED group 3b2 is on (period A2). A sensor signal is read out from each of the off-sensor pixel circuits 9c corresponding to the amount of light entering it during a detection period in which the infrared LEDs 3b are off (period A3). As discussed above, a difference circuit included in the source driver circuit 6 is used to calculate the differences between output signals from the first sensor pixel circuits 9a and output signals from the off-sensor pixel circuits 9c, as well as the differences between output signals from the second sensor pixel circuits 9b and off-sensor pixel circuits 9c. This provides sensor outputs without noise components.

[Variation of Sensor Pixel Circuit of Third Embodiment]

Figure 23:
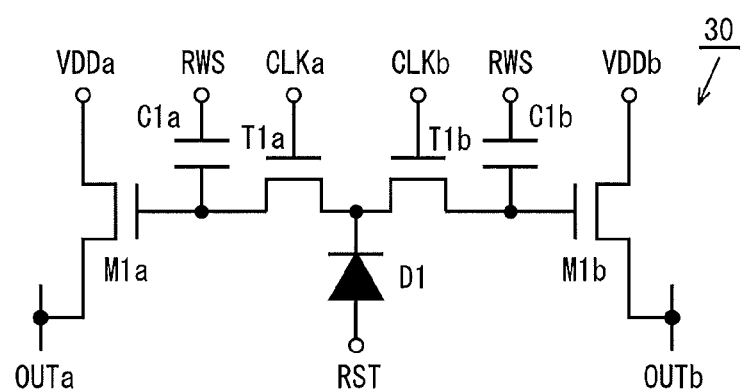
FIG. 23 is a circuit diagram illustrating a variation of the sensor pixel circuit according to the third embodiment.

FIG. 23 is a circuit diagram illustrating a variation of a sensor pixel circuit according to the third embodiment. The pixel circuit 30 shown in FIG. 23 includes transistors T1a, T1b, M1a and M1b, a photodiode D1, and capacitors C1a and C1b. The transistors T1a, T1b, M1a and M1b are n-type TFTs. In FIG. 23, the left half corresponds to the first sensor pixel circuit or second sensor pixel circuit while the right half corresponds to the off-sensor pixel circuit. The pixel circuit 30 is connected with clock lines CLKa and CLKb, a reset line RST, readout lines RWS, power supply lines VDDa and VDDb and output lines OUTa and OUTb.

Figure 24:
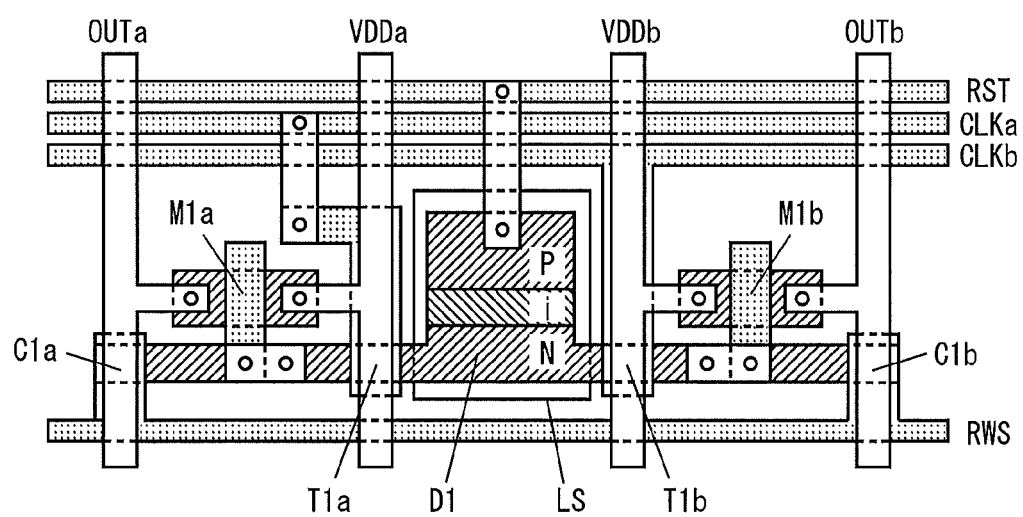
FIG. 24 is a layout of the sensor pixel circuit shown in FIG. 23.

As shown in FIG. 23, the photodiode D1 has an anode connected with the reset line RST and a cathode connected with the sources of the transistors T1a and T1b. The transistor T1a has a gate connected with the clock line CLKa and a drain connected with the gate of the transistor M1a. The transistor M1a has a drain connected with the power supply line VDDa and a source connected with the output line OUTa. The capacitor C1a is provided between the gate of the transistor M1a and one of the readout lines RWS. The transistor T1b has a gate connected with the clock line CLKb and a drain connected with the gate of the transistor M1b. The transistor M1b has a drain connected with the power supply line VDDb and a source connected with the output line OUTb. The capacitor C1b is provided between the gate of the transistor M1b and one of the readout lines RWS. In the pixel circuit 30, the node connected with the gate of the transistor M1a serves as a first accumulation node; the node connected with the gate of the transistor M1b serves as a second accumulation node; and the transistors M1a and M1b serve as readout transistors. FIG. 24 is a layout of the pixel circuit 30. FIG. 24 may be explained similarly to the layout of the first embodiment.

A pixel circuits 30 with this configuration may also be operated according to the timing shown in FIG. 22 such that a sensor signal is read out from a pixel circuit 30 illuminated by the first infrared LED group 3b1 via the output line OUTa, the sensor signal corresponding to the amount of light entering it during a detection period in which the first infrared LED group 3b1 is on (period A1). At the same time, a sensor signal is read out via the output line OUTb, corresponding to the amount of light entering it during a detection period in which the infrared LEDs 3b are off (period A3). Thus, sensor outputs without noise may be obtained by subtracting a sensor signal from the output line OUTb from a sensor signal from the output line OUTa.

Similarly, a pixel circuits 30 illuminated by the second infrared LED group 3b2 is operated according to the timing shown in FIG. 22 such that a sensor signal is read out via the output line OUTa, corresponding to the amount of light entering it during a detection period in which the second infrared LED group 3b2 is on (period A2). At the same time, a sensor signal is read out via the output line OUTb, corresponding to the amount of light entering it during a detection period in which the infrared LEDs 3b are off (period A3). Thus, sensor outputs without noise may be obtained by subtracting a sensor signal from the output line OUTb from a sensor signal from the output line OUTa.

Figure 25:
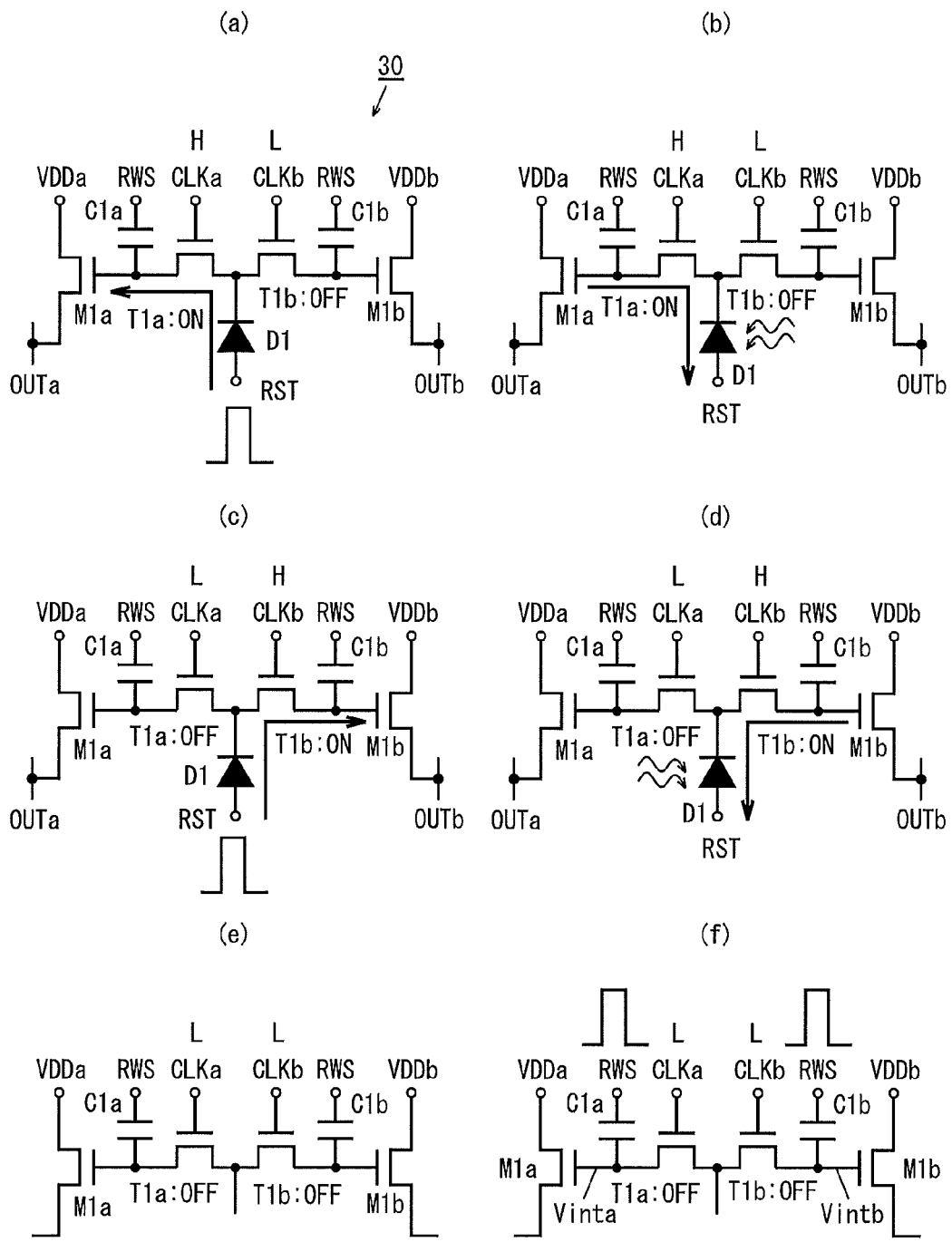
FIG. 25 illustrates the operations of the sensor pixel circuit shown in FIG. 23.

Operations of the pixel circuit 30 will now be described with reference to FIG. 25. The operations of a pixel circuit 30 illuminated by the first infrared LED group 3b1 will be described. Pixel circuits 30 illuminated by the second infrared LED group 3b2 are operated in a similar manner.

During the reset period occurring when the first infrared LED group 3b1 is on (time ta), the clock signal CLKa is high, the clock signal CLKb and readout signal RWS are low, and the reset signal RST is high for reset. During this period, the transistor T1a is on and the transistor T1b is off. Consequently, a current (forward with respect to the photodiode D1) flows from the reset line RST through the photodiode D1 and transistor T1a to the first accumulation node (FIG. 25(a)), resetting the potential Vinta to a predetermined level.

During the accumulation period occurring when the first infrared LED group 3b1 is on, the clock signal CLKa is high, the clock signal CLKb, reset signal RST and readout signal RWS are low. During this period, the transistor T1a is off and the transistor T1a is off. If light impinges on the photodiode D1 during this period, a current (photocurrent of the photodiode D1) flows from the first accumulation node through the transistor T1a and photodiode D1 to the reset line RST, drawing charge from the first accumulation node (FIG. 25(b)). Thus, the potential Vinta decreases according to the amount of light impinging on the photodiode during this period (i.e. while the first infrared LED group 3b1 is on). During this period, the potential Vintb remains unchanged.

During the reset period occurring when the infrared LEDs 3b are off (time tc), the clock signal CLKb is high, the clock signal CLKa and readout signal RWS are low, and the reset signal RST is high for reset. During this period, the transistor T1a is off and the transistor T1b is on. Consequently, a current (forward with respect to the photodiode D1) flows from the reset line RST through the photodiode D1 and transistor T1b to the second accumulation node (FIG. 25(c)), resetting the potential Vintb to a predetermined level.

During the accumulation period occurring when the infrared LEDs 3b are off (time tc to time td), the clock signal CLKb is high, the clock signal CLKa, reset signal RST and readout signal RWS are low. During this period, the transistor T1a is off and the transistor T1b is on. If light impinges on the photodiode D1 during this period, a current (photocurrent of the photodiode D1) flows from the second accumulation node through the transistor T1b and photodiode D1 to the reset line RST, drawing charge from the second accumulation node (FIG. 25(d)). Thus, the potential Vintb decreases according to the amount of light impinging on the photodiode during period A3 (time tc to time t3, i.e. while the infrared LEDs 3*b* are off). During this period, the potential Vinta remains unchanged.

During the retention period, the clock signals CLKa and CLKb, reset signal RST and readout signal RWS are low. During this period, the transistors T1*a* and T1*b* are off. If light impinges on the photodiode D1*a* during this period, the potentials Vinta and Vintb remain unchanged since the transistors T1*a* and T1*b* are off such that the photodiode D1*a* is electrically disconnected from the gates of the transistors M1*a* and M1*b* (FIG. 25(*e*)).

During the readout period, the clock signals CLKa and CLKb and reset signal RST are low, and the readout signal RWS is high for readout. During this period, the transistors T1*a* and T1*b* are off. During this period, each of the potentials Vinta and Vintb increases by the amount of increase in the potential of the readout signal RWS, and the amount of current Ia corresponding to the potential Vinta flows between the drain and source of the transistor M1*a*, while the amount of current Ib corresponding to the potential Vintb flows between the drain and source of the transistor M1*b* (FIG. 25(*f*)). The current Ia flows on the output line OUTa before being fed into the source driver circuit 6, while the current Ib flows on the output line OUTb before being fed into the source driver circuit 6.

In this way, in the pixel circuit 30 of the present embodiment, a single photodiode D1 (light receiving element) is shared by the first and second pixel circuits 10*a* and 10*b* described with respect to the first embodiment. The cathode of the shared photodiode D1 is connected to the source of the transistor T1*a* included in the section corresponding to the first pixel circuit and the source of the transistor T1*b* included in the section corresponding to the second pixel circuit.

A pixel circuit 30 located in an area illuminated by the first infrared LED group 3*b*1 is capable of detecting the amount of light present when the first infrared LED group 3*b*1 is on and the amount of light present when the infrared LEDs 3*b* are off. As such, determining the difference between them will provide sensor outputs without noise components. Similarly, a pixel circuit 30 located in an area where it is illuminated by the second infrared LED group 3*b*2 is capable of detecting the amount of light present when the second infrared LED group 3*b*2 is on and the amount of light present when the infrared LEDs 3*b* are off. Again, determining the difference between them will provide sensor outputs without noise components. Further, in the pixel circuit 30, since a single photodiode D1 is shared by two pixel circuits, the effects of fluctuations in sensitivity behavior of the photodiode may be cancelled. Moreover, the number of photodiodes may be reduced and the aperture ratio may be increased, increasing the sensitivity of the sensor pixel circuit.

While an arrangement has been illustrated where sensor pixel circuits 9 or pixel circuits 30 are divided into a plurality of groups arranged in a direction in which the gate lines GL are arranged, they may be divided into a plurality of groups arranged in a direction in which the source lines SL, not the gate lines GL, are arranged, similar to the first embodiment. Alternatively, they may be divided into a plurality of groups arranged both in a direction in which the gate lines GL are arranged and a direction in which the source lines SL are arranged.

Thus, the present embodiment includes an offset pixel circuit that performs sensing when the infrared LEDs are off, where an output from the offset pixel circuit is subtracted from an output from the sensor pixel circuit that performs sensing while the infrared LEDs are on. According to this arrangement, the output from the offset pixel circuit only contains noise components, and subtracting these noise components will provide sensor outputs with improved precision.

Further, the present embodiment allows each of the first infrared LED group 3*b*1 and second infrared LED group 3*b*2 to be turned on once in a frame, while allowing sensor outputs to be read out from all the sensor pixel circuits in the same frame. That is, the present embodiment achieves high-speed readout.

Furthermore, according to the present embodiment, there is almost no time lag between the period in which the light receiving element detects light with the first infrared LEDs 3*b*1 being on (period A1) and the period in which the light receiving element detects light with the second infrared LEDs 3*b*2 being on (period A2). Thus, advantageously, the ability to follow motion inputs will not be affected by the direction of the input. Further, the display device of the present embodiment initiates readout shortly after reset is completed, and initiates reset shortly after readout is completed. This makes it possible to freely decide the length of the period in which the infrared LEDs are on or off or the distance between such periods.

INDUSTRIAL APPLICABILITY

The present invention may be industrially useful as a display device including light sensitivity using non-visible light.

The invention claimed is:

1. A display device comprising:
an active matrix substrate;
a plurality of non-visible light sources;
a plurality of photosensors provided in a pixel region of the active matrix substrate for detecting reflected light originating from the non-visible light sources;
a sensor driver circuit configured to supply a sensor drive signal to the photosensors;
an amplifier circuit configured to amplify a signal read from the photosensors in response to the sensor drive signal and output a photosensor signal;
a signal processing circuit configured to process the photosensor signal output from the amplifier circuit; and
a light source control circuit configured to control on and off of the non-visible light sources,
wherein the plurality of photosensors are divided into a plurality of sensor groups in the pixel region, and
the light source control circuit causes separate sets of non-visible light sources, corresponding to the sensor groups, to be on during different time periods.

2. The display device according to claim 1, wherein:
the active matrix substrate includes:
a gate driver; and
a plurality of gate lines connected with the gate driver,
wherein the plurality of photosensors are divided into a plurality of sensor groups arranged in a direction in which the gate lines are arranged.

3. The display device according to claim 2, wherein:
the non-visible light sources are located along a side of the pixel region opposite that with the gate driver.

4. The display device according to claim 3, wherein:
the gate lines extend in a direction parallel to a long side of the active matrix substrate.

5. The display device according to claim 1, wherein:
the active matrix substrate includes:
a gate driver; and
a plurality of gate lines connected with the gate driver,
wherein the plurality of photosensors are divided into a plurality of sensor groups arranged in a direction in which the gate lines extend.

6. The display device according to claim 5, wherein:
the non-visible light sources are located on a rear side of the pixel region.

7. The display device according to claim 5, wherein:
the plurality of photosensors are also divided into a plurality of sensor groups arranged in a direction in which the gate lines are arranged.

8. The display device according to claim 1, wherein:
the sensor driver circuit, in synchronization with the light source control circuit, causes each of the sensor groups to be sequentially read.

9. The display device according to claim 1, wherein the non-visible light sources are infrared LEDs.

10. The display device according to claim 1, wherein:
the photosensors include:
a sensor pixel circuit configured to, in response to the sensor drive signal, accumulate a charge corresponding to an amount of light received during an accumulation period in which the non-visible light sources are on, and output, during a readout period, a sensor signal corresponding to the charge that has been accumulated; and
an off-sensor pixel circuit configured to, in response to the sensor drive signal, accumulate a charge corresponding to an amount of light received during an accumulation period in which the non-visible light sources are off, and output, during a readout period, a sensor signal corresponding to the charge that has been accumulated,
wherein the signal processing circuit calculates a difference between the sensor signal output from the sensor pixel circuit and the sensor signal output from the off-sensor pixel circuit.

11. The display device according to claim 10, wherein each of the sensor pixel circuit and the off-sensor pixel circuit includes:
one light receiving element;
one accumulation node capable of accumulating a charge corresponding to an amount of light sensed;
a readout transistor having a control terminal electrically connectable with the accumulation node; and
a retaining switching element provided on a path of current passing through the light receiving element, the retaining switching element being configured to be turned on or off in response to the control signal.

12. The display device according to claim 11, wherein in each of the sensor pixel circuit and the off-sensor pixel circuit,
the retaining switching element is provided between the accumulation node and one terminal of the light receiving element, and
another terminal of the light receiving element is connected with a reset line.

13. The display device according to claim 10, wherein the sensor pixel circuit and the off-sensor pixel circuit share one light receiving element, and
one terminal of the light receiving element is connected with one end of a retaining switching element included in each of the sensor pixel circuit and the off-sensor pixel circuit and another terminal is connected with a reset line.

14. The display device according to claim 1, further comprising:
a counter substrate being opposite the active matrix substrate; and
liquid crystal sandwiched between the active matrix substrate and the counter substrate.

* * * * *